ус010803025в2

(12) United States Patent
Mueller et al.

(10) Patent No.: US 10,803,025 B2
(45) Date of Patent: Oct. 13, 2020

(54) SYSTEM AND PROCESS FOR SCALABLE AND SECURE CONTENT DELIVERY

(71) Applicants: AT&T Intellectual Property I, L.P., Atlanta, GA (US); AT&T Mobility II LLC, Atlanta, GA (US)

(72) Inventors: Julius Mueller, East Palo Alto, CA (US); Erie Lai Har Lau, Redmond, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 113 days.

(21) Appl. No.: 16/123,018

(22) Filed: Sep. 6, 2018

(65) Prior Publication Data

US 2020/0081999 A1    Mar. 12, 2020

(51) Int. Cl.
*G06F 16/182* (2019.01)
*H04L 29/08* (2006.01)
*H04L 12/26* (2006.01)
*H04L 9/06* (2006.01)
*G06F 16/27* (2019.01)

(52) U.S. Cl.
CPC .......... *G06F 16/1834* (2019.01); *G06F 16/27* (2019.01); *H04L 9/0643* (2013.01); *H04L 43/04* (2013.01); *H04L 67/06* (2013.01); *H04L 67/108* (2013.01); *H04L 2209/38* (2013.01)

(58) Field of Classification Search
CPC ... G06F 16/1834; G06F 16/27; H04L 9/0643; H04L 43/04
USPC ........................................................ 709/223
See application file for complete search history.

(56) References Cited

U.S. PATENT DOCUMENTS

| 7,593,922 | B1* | 9/2009 | Wright .............. G06F 16/1837 |
| 8,108,537 | B2 | 1/2012 | Fu et al. |
| 9,426,664 | B2 | 8/2016 | Hong et al. |
| 9,668,109 | B2 | 5/2017 | Bourlas et al. |
| 9,917,886 | B2 | 3/2018 | Sentinelli et al. |
| 2009/0063507 | A1* | 3/2009 | Thompson .......... G06F 16/1834 |
| 2010/0229205 | A1* | 9/2010 | Hakusui ................. H04H 20/72 725/62 |

(Continued)

OTHER PUBLICATIONS

Legout, Arnaud et al., "Rarest First and Choke Algorithms Are Enough", IMC'06, Oct. 25-27, 2006, Rio de Janeiro, Brazil, 2006.

*Primary Examiner* — Meng Vang
(74) *Attorney, Agent, or Firm* — Guntin & Gust, PLC; Douglas Schnabel

(57) ABSTRACT

Aspects of the subject disclosure may include, for example, segmenting a file to obtain a set of segments, wherein the file can be regenerated according to a recombination of the set of segments. At least some segments are transported to a targeted group of users including a first group of users and a second group of users, via unlicensed frequency spectrum and according to a peer-to-peer file sharing process. A segmentation record identifying the set of segments is provided to the targeted group of users. A progress of a delivery of the set of segments is monitored according to the segmentation record. The progress of the delivery is analyzed to identify a deficiency in delivery of a particular segment of the set of segments. Responsive to the deficiency, the particular segment is provided to the first group of users via a licensed frequency spectrum. Other embodiments are disclosed.

20 Claims, 13 Drawing Sheets

(56) References Cited

U.S. PATENT DOCUMENTS

| | | | |
|---|---|---|---|
| 2012/0203925 A1* | 8/2012 | Curcio | H04L 67/12 |
| | | | 709/235 |
| 2015/0223077 A1 | 8/2015 | Fan et al. | |
| 2016/0094599 A1* | 3/2016 | Sridhar | H04W 40/36 |
| | | | 709/219 |
| 2016/0291940 A1* | 10/2016 | Searle | H04L 63/10 |
| 2017/0201461 A1 | 7/2017 | Cheng et al. | |
| 2017/0333790 A1* | 11/2017 | Champy | A63F 13/335 |
| 2018/0076839 A1 | 3/2018 | Baghel et al. | |
| 2018/0139508 A1 | 5/2018 | Norin et al. | |
| 2018/0146041 A1 | 5/2018 | Moustafa et al. | |

* cited by examiner

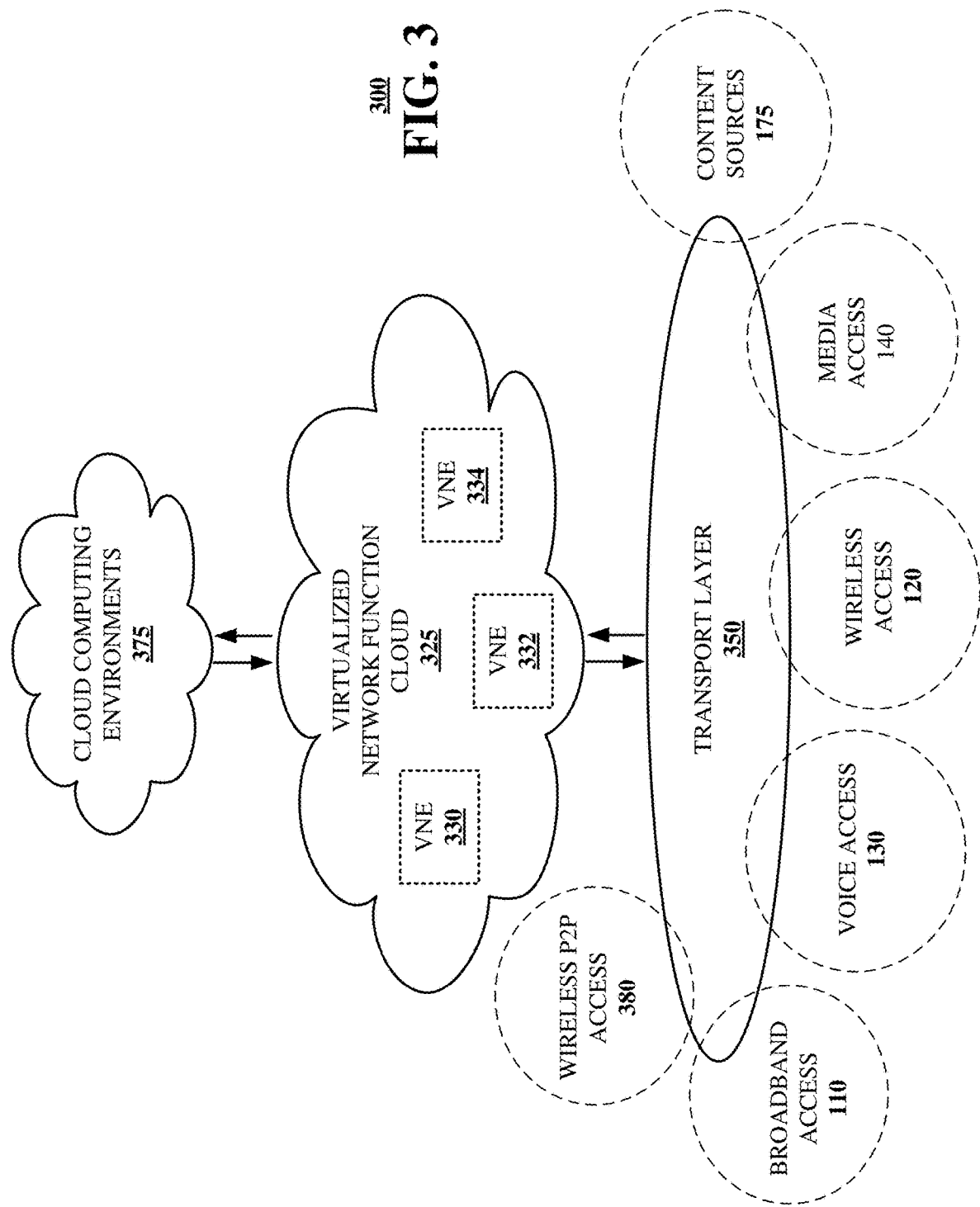

SYSTEM AND PROCESS FOR SCALABLE AND SECURE CONTENT DELIVERY

FIELD OF THE DISCLOSURE

The subject disclosure relates to a system and process for scalable and secure content delivery.

BACKGROUND

Some wireless communication networks utilize licensed portions of a frequency spectrum, while others utilize unlicensed portions or combinations of licensed and unlicensed frequency spectra. Examples include mobile cellular service, which often uses licensed frequency spectrum to provide wireless service over a relatively large area, e.g., a macro cell or smaller areas through e.g. a small cell or femto cell serving 4G or 5G wireless service. In at least some instances, mobile cellular service can include wireless service in unlicensed frequency spectra, e.g., through wireless access points. Wireless access points can operate according to wireless protocols, such as IEEE 802.11, including WiFi, Bluetooth and the like. Wireless service is typically available within a geographic region limited in extent with respect to a wireless base station and/or access point providing the service.

Wireless service may be provided to stationary equipment, e.g., a connected home or business, and/or mobile equipment. Wireless services can include, without limitation, voice and/or data services to equipment of mobile users, e.g., smart phones, tablet devices, laptop computers, and the like. Data services can include short message service (SMS), multimedia messaging service (MMS), email, web browsing, file transfer, and the like. Recent trends have also seen a growth in machine-to-machine (M2M) communications, e.g., with the advent of the Internet of Things (IoT), resulting in a rapid expansion in the number of wireless service subscribers. At the same time, applications that use wireless services, such as streaming media, can pose significant bandwidth demands on provider networks.

In order to satisfy increasing demand for connectivity from multiple business verticals, wireless service providers can either expand coverage areas as well as available bandwidth or densify the network through service offerings in various frequency spectra at the same location. For example, a mobile service provider can procure additional licensed spectrum, install and/or upgrade mobile cellular infrastructure including new and/or upgraded macro cell sites, microcell sites and/or femto cell sites, and/or install wireless access points operating in unlicensed spectrum, e.g., WiFi hotspots. While some mobile users can move to favorable locations, e.g., WiFi hotspots when using applications requiring heavy data usage, others may not be able to do so.

Demand for high data rates is increasing to accommodate advances in other technologies, such as connected cars. Autonomous vehicles create a lot of data (in the order of KBs, MBs and even GBs) and exchange part of this data between a vehicle and a (edge) cloud service via a cellular network. Examples of demand for wireless data include firmware updates, passenger entertainment, map updates, positioning correction information, just-in-time services, e.g., to order a parking spot on-demand, and so on. A fourth generation broadband cellular network technology (4G) is adapted to deliver mobile broadband but was not designed to compensate all new expected new challenges, such as those for connected cars or autonomous vehicles. Although future, e.g., fifth generation broadband cellular network technology (5G) may address some or all of current data demand, its implementation is still far out. Even when deployment begins, it will likely occur incrementally and will likely take years to reach a large coverage of urban spaces.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
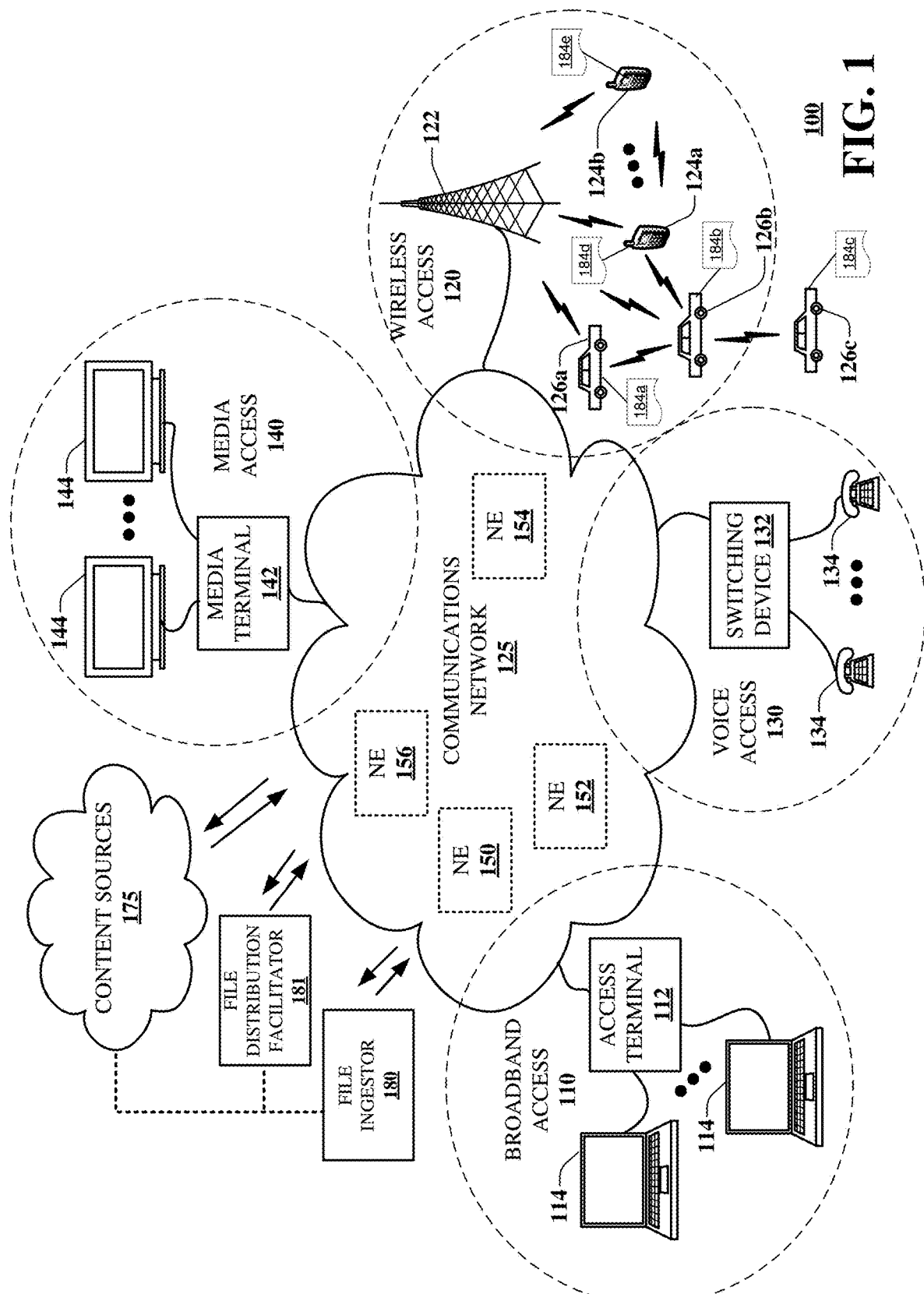
FIG. 1 is a block diagram illustrating an example, non-limiting embodiment of a communications network in accordance with various aspects described herein.

The subject disclosure describes, among other things, illustrative embodiments that combine mobile cellular licensed and unlicensed spectrum with a peer-to-peer (P2P) file sharing to facilitate transport of massive amounts of data to diverse endpoints. The techniques disclosed herein offload at least some data transport from licensed frequency services to avoid commercial network overload and customer disappointment consuming other services, while also promoting a fast and scalable delivery mechanism for content in the network. Examples disclosed herein include content provided by a producer for wide distribution to machines and/or mobile assets, such as connected cars (CC), drones, smart devices, and the like. For example, transported data content can include, without limitation, layered high definition map updates for CC, no-fly database updates for drones, drone obstacle identification and object/model sharing. More generally, transported data can include high definition multimedia content, e.g., 1080p, 4 k, 8 k, data sharing, software over-the-air (SOTA), firmware over-the-air (FOTA) updates connected devices, e.g., including CC, drones, smart appliances, map updates, device monitoring and profiling, and the like. The content distribution can include $3^{rd}$ generation P2P file sharing process, such as bit torrents. Other embodiments are described in the subject disclosure.

One or more aspects of the subject disclosure include a system, including a processing system having a processor and a memory that stores executable instructions that. The instructions, when executed by the processing system, facilitate performance of operations. The operations include disaggregating a file to obtain a set of file segments, wherein the file can be regenerated according to a recombination of the set of file segments. At least some file segments of the set of file segments are transported to equipment of a targeted group of users via an unlicensed frequency spectrum and according to a P2P file sharing process. A secured and signed segmentation record is forwarded to the equipment of the targeted group of users comprising a first group of users and a second group of users, wherein the segmentation record identifies the set of file segments. Progress of a delivery of the set of file segments to the equipment of the targeted group of users is monitored according to the segmentation record. The progress of the delivery of the set of file segments is analyzed to identify a deficiency in delivery of a particular file segment of the set of file segments to the equipment of the targeted group of users. Responsive to the deficiency, the particular file segment is provided to equipment of the first group of users wirelessly via a licensed frequency spectrum.

One or more aspects of the subject disclosure include a process that includes segmenting, by a processing system including a processor, a file to obtain a set of file segments, wherein the file can be regenerated according to a recombination of the set of file segments, and wherein at least some file segments of the set of file segments are transported to equipment of a targeted group of users via an unlicensed frequency spectrum and according to a P2P file sharing process. A segmentation record is provided, by the processing system, to the equipment of the targeted group of users including a first group of users and a second group of users. The segmentation record identifies the set of file segments. A deficiency in delivery of a particular file segment of the set of file segments to the equipment of the targeted group of users is identified, by the processing system, according to the segmentation record. Responsive to the deficiency, the particular file segment is provided, by the processing system, to equipment of the first group of users wirelessly via a licensed frequency spectrum.

One or more aspects of the subject disclosure include a non-transitory, machine-readable medium, including executable instructions that, when executed by a processing system including a processor, facilitate performance of operations. The operations include segmenting a data item to obtain a set of data item segments, wherein the data item can be regenerated according to a recombination of the set of data item segments, and wherein at least some data item segments of the set of data item segments are transported to equipment of a targeted group of users via an unlicensed frequency spectrum and according to a P2P file sharing process. A segmentation record is provided to the equipment of the targeted group of users including a first group of users and a second group of users, wherein the segmentation record identifies the set of data item segments. A deficiency in delivery of a particular data item segment of the set of data item segments to the equipment of the targeted group of users is identified according to the segmentation record. Responsive to the deficiency, the particular data item segment is provided to equipment of the first group of users wirelessly via a licensed frequency spectrum.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of wireless devices, e.g., mobile devices 124a, 124b, generally 124, and vehicles 126a, 126b, 126c, generally 126, via a base station or wireless access point 122. Alternatively or in addition, the communications network 125 can provide voice access 130 to a number of telephony devices 134, via switching device 132 and/or media access 140 to a plurality of audio/video display devices 144 via media terminal 142. In at least some embodiments, the communication network 125 is coupled to one or more content sources 175 of audio, video, graphics, text, data files, e.g., software updates and/or firmware updates, and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a number of network elements (NE) 150, 152, 154, 156, etc., for facilitating one or more of the broadband access 110, the wireless access 120, the voice access 130, the media access 140 and/or the distribution of content from content sources 175. The communications network 125 can include one or more of a circuit switched, a packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include one or more of a 4G, 5G, or higher generation base station, a wireless access point that operates via an 802.11 standard such as 802.11n, 802.11ac or other wireless access terminal. The mobile devices 124 can include mobile phones, e-readers, tablets, phablets, wireless modems, and/or other mobile computing devices. The vehicles 126 can include connected cars, self-driving cars or trucks, remote operated vehicles, such as drones, including pilotless and/or remote operated aerial vehicles.

Although the example illustrates mobile devices 124, 126 in communication with the base station or access point 122, it is understood that the base station or access point 122 can be in communication with other wireless devices that might not necessarily be mobile. Examples of other wireless devices include, without limitation, smart home appliances, e.g., internet accessible thermostats, video surveillance systems, alarm systems, smart meters, and the like. Wireless communication services can include communications to virtually any Internet accessible device according to IoT, including M2M communications.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the communication network 100 can facilitate in whole or in part monitoring P2P file sharing, analyzing progress and/or efficiencies of P2P file sharing applications, and/or coordinating activities to increase progress and/or efficiencies. In at least some embodiments, file sharing progress is facilitated by selectively injecting segments into a group of P2P participants. The illustrative example includes a file ingestor 180 and a file distribution facilitator 181. The file ingestor 180 receives a data content item for distribution to a group of targeted wireless devices, e.g., the mobile phones 124 and/or vehicles 126. The file ingestor 180 is in communication with the file distribution facilitator 181. In some embodiments, one or more of the file ingestor 180 or the file distribution facilitator 181 determines whether P2P file sharing should be applied to the received data item. Such decisions can be based on one or more of a number of targeted wireless devices exceeding some threshold, a data size of the data content item exceeding some threshold, a network state, such as available capacity, congestion, error status, and so on.

To the extent that P2P file sharing is employed, the file ingestor 180 disaggregates the data item into a set of smaller data item segments. One of the file ingestor 180, the file distribution facilitator 181 or both generates a segmentation record. In at least some embodiments, the segmentation record provides a complete listing of segments, wherein the original data item can be regenerated, e.g., by a file sharing client application, according to a recombination of the set of data item segments. In some embodiments, one or more of the mobile devices 124 and/or vehicles 126 receives at least some segments of the set of segments from the base station or access point 122 via licensed frequency spectrum. For example, licensed frequency distribution by the base station or access point 122 can be used to provision one or more mobile devices and/or vehicles 126 with some or all of the data item segments. One or more of these receiving mobile devices 124 and/or vehicles 126 is then available to share one or more of the received segments with other mobile devices 124 and/or vehicles 126 according to the P2P process.

In at least some embodiments, a progress of the receiving of data item segments for one or more of the mobile devices and/or vehicles 126 of the group of targeted wireless devices is determined according to the segmentation record. For example, the file distribution facilitator 181 generates a file segmentation record and facilitates distribution of the segmentation record to the targeted wireless devices 124, 126. In some embodiments, the segmentation record can be distributed to each of the targeted wireless devices 124, 126 via the base station or access point 122 using licensed frequency spectrum. According to the illustrative example, each of the targeted wireless devices 124, 126 can maintain a progress report 184a ... 184e, generally 184. The progress report 184 identifies a progress of receipt of the data item segments of the set of data item segments. In at least some embodiments, the progress report 184 identifies one or more of those data item segments received by the respective targeted wireless device 124, 126, or those data item segments not yet received by the respective targeted wireless device 124, 126, or a combination of segments received and not yet received.

In some embodiments, the targeted wireless devices 124, 136 provide an indication of the progress report 184 to the file distribution facilitator 181. The file distribution facilitator 181, in turn, can analyze the progress reports 184 to determine whether any of the targeted wireless devices 124, 126 require data item segments, which data item segments are required, whether there are any time constraints on a transfer of the complete file, and so on. Responsive to the analysis, the file distribution facilitator 181 can facilitate a further distribution of segments to one or more of the targeted wireless devices 124, 126 via the base station or access point 122 using licensed frequency spectrum. For example, the file distribution facilitator 181 can provide one or more of the missing segments to one or more of the targeted wireless devices 124, 126 in need of the missing segments. Alternatively or in addition, the file distribution facilitator 181 can provide one or more of the missing segments to other wireless devices 124, 126, relying on the P2P process to propagate the missing segments to the one or more of the targeted wireless devices 124, 126 in need of the missing segments.

This can include sending or seeding a missing segment to another wireless device of the targeted wireless devices 124, 126. Considering the user of selective distribution or seeding in combination with a P2P process, there is a likelihood that the other wireless device may have already received the missing segment. Accordingly, in at least some embodiments, the sending or seeding of the missing segment occurs after first determining that the intended recipient device has not already received the missing segment. It is understood that in at least some applications the initial sending or seeding of segments and/or the sending or seeding of missing segments can include sending or seeding segments to other wireless devices 124, 126 that may not be included in the targeted group of wireless devices 124, 126. This approach allows for a larger group of wireless devices 124, 126 to participate in the P2P process as facilitators. It is further understood that in at least some embodiments, participation of non-targeted wireless devices 124, 126 can be incentivized. By way of non-limiting example, incentives can include providing points, e.g., points that can be accumulated and used in a service provider's ecosystem or elsewhere, additional data that can be added to a subscribed data limit, and the like.

In at least some embodiments, at least some of the targeted wireless devices 124, 126 can analyze which data item segments it has and determines which data item segments it can upload to other peers according to the P2P process. In at least some embodiments, participants in the P2P process can include a client application. For example, the client application can seek out readily available data item segments, e.g., from peers, and download them immediately, rather than halting the download and waiting for the next (and possibly unavailable) piece in line, which typically reduces the overall time of the download. Some example client applications include, without limitation, μTorrent, Xunlei, Transmission, qBittorrent, Vuze, Deluge, BitComet and Tixati.

Figure 2A:
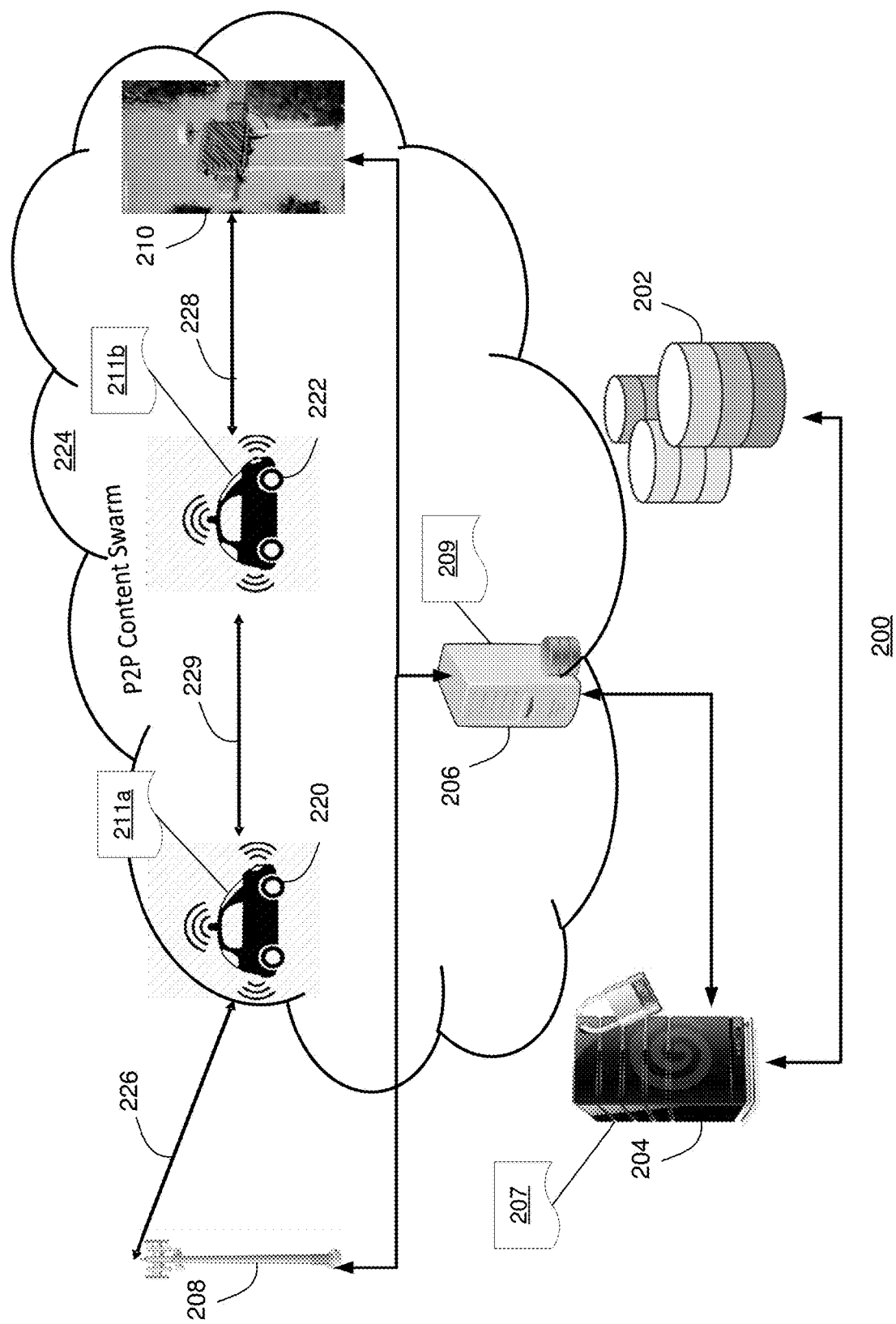
FIG. 2A is a block diagram illustrating an example, non-limiting embodiment of a system functioning within the communication network of FIG. 1 in accordance with various aspects described herein.

FIG. 2A is a block diagram illustrating a more detailed example of a non-limiting embodiment of a file distribution system 200 functioning within the communication network of FIG. 1 in accordance with various aspects described herein. The data content items generally originate at a data content source 202. For example, the data content source 202 can be a producer of content, e.g., a media producer, such as DISNEY® or NETFLIX®, a network service provider, a source of equipment that can be serviced by the content, e.g., an auto manufacturer that may distribute software and/or firmware updates over the air (SOTA/FOTA) to vehicles, a service provider providing a network accessible service to client applications hosted on wireless devices, government agencies, e.g., local police, National Weather Service, the Emergency Broadcast System, and the like.

The data content source 202 provides a data content item to a file ingestor 204. The file ingestor 204 disaggregates, divides or otherwise partitions the data content item into a set of data item segments. It is understood that the data item segments have a size that is less than a size of the original data content item. In some embodiments, the data item segments are substantially equal in size, e.g., ten 1 Mb segments for a 10 Mb data content item. Alternatively or in addition, the data item segments of a disaggregated data content item can vary in size. Disaggregation can include any process that allows a data content item to be divided into segments or chunks that can be recombined to obtain the original data content item.

In some embodiments, a size of a data item segment can be fixed. Data content item segment, or chunk sizes can include, without limitation, a fixed number of bytes per segment, e.g., 1 Mb and/or a fixed number of segments per data content item, e.g., a number of "N," say 10 segments per data content item or file, with a segment size being determined by a division of the data content item by the number of segments. It is understood that segment sizes can be selected based on one or more factors. Factors can include, without limitation, a type of data content item, e.g., streaming video versus text. Other factors can include network traffic conditions, type and/or capabilities of recipient devices, and the like. For example, a segment size may depend on a buffer size of a streaming media player. Alternatively or in addition, segment size may depend upon a quality of service requirement and/or a priority of the data item, e.g., with higher priority segments being assigned a greater or lesser size, such that a transfer requires coordination of fewer or more segments than a lower priority data item. Network traffic conditions can include, without limitation, network congestion, transport delay, signal-to-noise ration and/or bit error rate, error correction performance and so on. As network conditions may change, different segmentations may be selected based on the network conditions to facilitate efficient transfers of data content items.

It is further envisioned that in at least some embodiments, a size of a segment or chunk can vary. For example, multiple segment sizes for a different data content items can be fixed according to a particular segmentation and/or transfer strategy. A first segmentation of one data content item can be accomplished according to a first fixed segment size, whereas, a second segmentation of another data content item can be accomplished according to a second fixed segment size, which differs from the first. In at least some applications, segment size can vary for the same data content item. For example, a data content item can be divided into a number of segments, with at least some segments having different sizes than other segments. Segments can be transported according to a P2P process based on segment size. Some P2P participants may be selected based on segment size. Alternatively or in addition, segment size(s) may be selected based on the P2P participants. Selections of segment size and/or P2P participants can be based on one or more of the foregoing criteria, e.g., network conditions, data type, etc., and/or according to the P2P participants. For example, stationary or slow moving P2P participants may be selected for sharing a first segment size, e.g., a relatively large segment size, whereas, fast moving P2P participants may be selected for sharing a second segment size, e.g., a relatively small segment size. Accordingly, a data content item can be segmented according to multiple sizes to allow for implementation of a flexible P2P strategy.

In at least some embodiments, segment size can change during a P2P distribution process. For example, a data content item can be segmented according to a first segment size. The first segments can be distributed according a P2P process as disclosed herein. A file distribution facilitator can monitor progress of the file transfer and evaluate whether the process would be expedited according to a segmentation of a different size. To the extent that a different segment size would be beneficial, the distribution facilitator could initiate a different segmentation. It is envisioned that in at least some embodiments, that different segment sizes can be selected to be compatible.

In at least some embodiments, the ingestor 204 generates a segmentation record 207. The segmentation record 207, without limitation, can identify the data item segments of a disaggregated file. For example, the segmentation record 207 includes an identifier of the data content item as well as a segment reference number, e.g., a sequential or ordinal number, and the set of sequential or ordinal numbers identifying all data item segments of the associated data content item. The segmentation record can be used by one or more elements of the system 200 to track progress of a particular file distribution. The sequence number or ordinal reference can be used to arrange data item segments that may be received by a targeted wireless device out of order. The segmentation record and its entries are secured and signed in order to prevent tampering of data by other malicious entities.

In at least some embodiments, a security measure can be added to the process, e.g., to provide some assurance that data item segments received from peers are legitimate and authentic. According to the illustrative example, the file ingestor 204 applies a security mechanism to one of the data content item and/or the data item segments. Security mechanisms can include, without limitation, one or more of hash algorithms, checksums, encryption, blockchain, authentication and the like. In some embodiments, a data content item may be secured, e.g., by a security key to prevent unauthorized access. For example, distribution of copyright protected material may include some measure of scrambling that requires application of a key to obtain an unscrambled version. Such scrambling would allow peers of a P2P process to participate in a file distribution, without necessarily requiring access to the transferred data content item.

A blockchain-type, certification-type or Digital-Rights-Management-(DRM)-type of security measure can be applied to each of the data item segments. For example, the file ingestor 204 encodes each data item segment into a block of digital data that is uniquely signed and/or identified. According to a blockchain algorithm, each data item segment, or block, is connected to another block, such as the one before and/or after it. When applied in this manner, the blockchain algorithm can create an irreversible, immutable chain. Accordingly, data item segments, or blocks, are chained together, preventing any individual data item segment, or block, from being altered or an unauthorized block from being inserted between two existing blocks.

The system 200 also includes a file distribution facilitator 206. The file distribution facilitator 206 is in communication with the file ingestor 204 and one or more mobile cellular sites 208. In at least some embodiments, the file distribution facilitator 206 is in communication with the producer 202. Information obtained from the producer 202 can include identification of the data content item and identification of targeted recipients and/or targeted equipment of targeted recipients. In at least some embodiments, information obtained from the producer 202 can include identification of a priority, e.g., ranging from critical to trivial, uncritical or unimportant, e.g., "nice to have" but not necessary. In some embodiments, timing requirements for a file distribution can be imposed by the producer 202. For example, a safety related firmware upgrade to a vehicle may require full compliance within a time period, such as within 24 hours, within one week, etc.

In operation, the file distribution facilitator 206 identifies targeted wireless devices that should receive the data content item. The file distribution facilitator 206 also identifies the data content item to be distributed to the targeted wireless devices, the segmentation record, and any timing and/or priority requirements as may be related to the distribution. In some embodiments, the file distribution facilitator 206 determines a strategy for initiating, priming or seeding a P2P process. The strategy can be based on one or more of identification of the targeted wireless devices, a size of the data content item, a priority or criticality of the distribution and so on. In some embodiments, the file distribution facilitator 206 sends a complete set of all segments to a particular wireless device or group of wireless devices of the targeted wireless devices. Selection of the initial recipients can be based on one or more of a geographic location of the recipient wireless device, an available link quality associated with a wireless link to the recipient device, an identity of the particular wireless device, e.g., according to a type of device, a related user account. Other considerations can include, without limitation, whether a recipient device is a fast moving device, a slow moving device or a stationary device. For example, slow moving devices may be preferred over stationary devices to increase a likelihood of propagating segments to peers outside of a range of the participating cell.

In at least some embodiments, the recipient wireless device, e.g., a first auto 220, receives a copy of the segmentation record and updates a progress report 211a that identifies received segments, missing segments, or both received and missing segments. In some embodiments, the progress report 211a can be transmitted from the auto 220 back to the file distribution facilitator 206. Other participating wireless devices, such as a second car 222 can also maintain progress reports 211b, also providing an indication of transfer progress to the file distribution facilitator 206. The file distribution facilitator 206 can monitor file and/or segment distribution process based on the progress reports 211a, 211b, generally 221. Progress reports 211 can identify one or more of the wireless device, e.g., according to an IP address, a MAC address, a user account, a device type, and the like. The progress report can identify when a targeted wireless device has received a complete set of segments of a data item. The file distribution facilitator 206 can track completions, and terminate a P2P process when all or at least some predetermined portion of the targeted wireless devices have received the complete set of segments.

Once one or more participating wireless devices have received some or all of the data item segments of a particular data content item, a P2P process can be applied. The P2P generally allows for participating wireless devices to share one or more already received segments. The sharing can be accomplished according to a push algorithm, in which a participant having received one or more segments, i.e., a source, identifies participants within range and facilitates a transfer of one or more of the received segments. In some embodiments, a push algorithm includes sending messages from the source to other participants that identifies available segments. Recipient wireless devices can evaluate available segments against an associated progress report to identify missing segments. The recipient wireless devices can send a message to the source identifying missing segments.

By way of non-limiting example, the message can include a specific request for one or more of the missing segments. The source, in response, can supply the requested segments over a direct wireless link between the wireless devices 229 offloading the licensed cellular network. The wireless link 229 can include, without limitation, a wireless link operating in an unlicensed frequency band, such as forms of WiFi, millimeter wave, laser, or short-range communication technologies providing a radio interface for user equipment (UE) to UE communications. Without limitation, examples of short-range communication can include PC5 and/or alternative direct short range communication (DSRC), e.g., based on IEEE 802.11p. An example protocol is disclosed in 3GPP LTE-V2X PC5, also known as LTE side-link. Alternatively or in addition, the wireless link can include operation in licensed frequency spectra, e.g., according to Uu-air interface 226 between a UE 220 and an eNB 208. The eNB 208 can include functionality to identify and facilitate a wireless link to the requesting device. For example, the link can include traditional cellular communications, unlicensed frequency communications at network edge devices, such as wireless access points 210 or hotspots that can communicate to the requesting wireless device 222 in a wireless link 228 operating in unlicensed frequency bands. Alternatively or in addition, the eNB 208 can relay the communication to the file distribution facilitator 206, which identifies and/or facilitate a wireless link to the requesting device through one or more of the available wireless links 226, 229, 228. Furthermore, Road-Side-Units (RSU) type wireless endpoints such as 210 can be considered part of the supporting communication infrastructure. For example, RSUs 210 can include caching functionalities.

Alternatively or in addition, the sharing can be accomplished according to a pull algorithm, in which a participant having determined that one or more segments are required, i.e., a destination, identifies participants within range and facilitates a transfer of one or more of the received segments. In some embodiments, a pull algorithm includes sending messages from the destination to other participants that identifies missing segment(s). Hereby, data is exchanged in interest groups namely swarms for only one item represented by the segment lists or progress reports bilateral. In the example of FIG. 2A, the two vehicles 220 and 222 first exchange progress reports and later optionally segments. Missing elements in the progress report in one vehicle (220) that are available in the other vehicles (e.g., 222) can be request and delivered via a segment push algorithm. The selection of the segments is out of scope for this document and could be the rarest-piece-first-strategy of P2P Torrent technology. The rarest-piece-first-strategy improves the overall availability of the data by increasing the availability of the rarest segment in the swarm. Destination wireless devices can evaluate missing segments against an associated progress report to identify missing segments. The recipient wireless devices can evaluate missing segments required from the destination wireless device against a progress report of the recipient wireless device. For example, the evaluation can identify whether a recipient device has already received one or more of the segments required by the destination. To the extent that missing segments are available, the recipient wireless device sends a message according to the P2P protocol to provide one or more of the missing segments to the destination wireless device. Transport of the segments can include one or more of the foregoing wireless links, e.g., Uu-air interface and/or a short-range communication interface, or other suitable wireless interface, including the various examples disclosed herein.

In at least some embodiments, one or more progress reports 211 are communicated to the file distribution facilitator 206. The file distribution facilitator 206, in turn, can evaluate missing segments for one or more destination devices of the targeted devices 220, 222 based on the progress reports 211. One or more of received information, e.g., progress reports and results of analyses can be stored in a P2P progress report 209. Having identified missing segment(s) and associated wireless devices, the file distribution facilitator 206 can further analyze progress reports 211, e.g., according to the P2P progress report 209, to identify potential source devices for serving the missing segment(s) to the destination devices. Any wireless device having already received a particular segment can serve as a source of that segment to other target devices missing the particular segment. In at least some embodiments, the file distribution facilitator 206 selects one or more sources for providing the missing segment(s) to the destination devices according to the P2P process. Selection of one or more sources can be based on position, location information, the proximity and/or channel quality between communicating instances determined individually and/or controlled by the eNB or swarm.

Position information can include, without limitation, a location of a source device, a location of a destination device, a relative location between the source and the destination device, or any combination thereof. Location information can be reported by one or more of the source and destination devices, e.g., according to a location application and/or GPS receiver of the device(s). Alternatively or in addition, location information can be determined by a wireless service provider. For example, locations can be determined according to distance or range estimates based on one or more of power level, time delay, time difference of arrival, phase difference, triangulations, and the like.

It is understood that in at least some embodiments, a network service provider can cache one or more segments, e.g., including complete sets of segments, at network edge locations. Edge locations can include, without limitation, wireless access points 210 mounted on RSUs 210 or deployed at alternative locations. At least some wireless access points provide wireless service to wireless devices 220, 222 via unlicensed frequency spectra, including any of the examples disclosed herein or equivalents. Caching can be used to supplement P2P distribution by providing wireless access to segments for destination devices of the targeted wireless devices is within wireless service range of the network edge device 210.

According to the illustrative example, the network edge device 210 is in communication with one or more of the file ingestor, 204 and file distribution facilitator 206. The network edge device 210 can participate as an injection point, e.g., similar to the cellular base station 208. Alternatively or in addition, the network edge device 210 can participate as a member of the P2P application, e.g., receiving and/or transmitting segments to other wireless devices of the group of targeted wireless devices. In at least some scenarios, the network edge device 210 is equivalent to a P2P device having a complete set of segments.

It is envisioned that distribution of at least some data content may be time critical. Accordingly, the illustrative systems discussed herein can include provisions that may decide whether to participate in the P2P process based on a timing aspect indicating a timing criticality having a relatively short time period. Alternatively or in addition, progress of an implemented P2P process can adapt according to a timing aspect. For example, if a timing aspect includes a maximum period for distribution to a group of targeted wireless devices, the system 200 may initiate distribution of the data content item according to a relatively limited seeding so as to reduce a burden to licensed frequency spectra. As time progresses, additional seedings may be necessary based on a remaining time of the maximum distribution period. It is conceivable that in at least some circumstances, Licensed frequency spectra can be used to distribute some or all segments missing as determined by the P2P process.

Figure 2B:
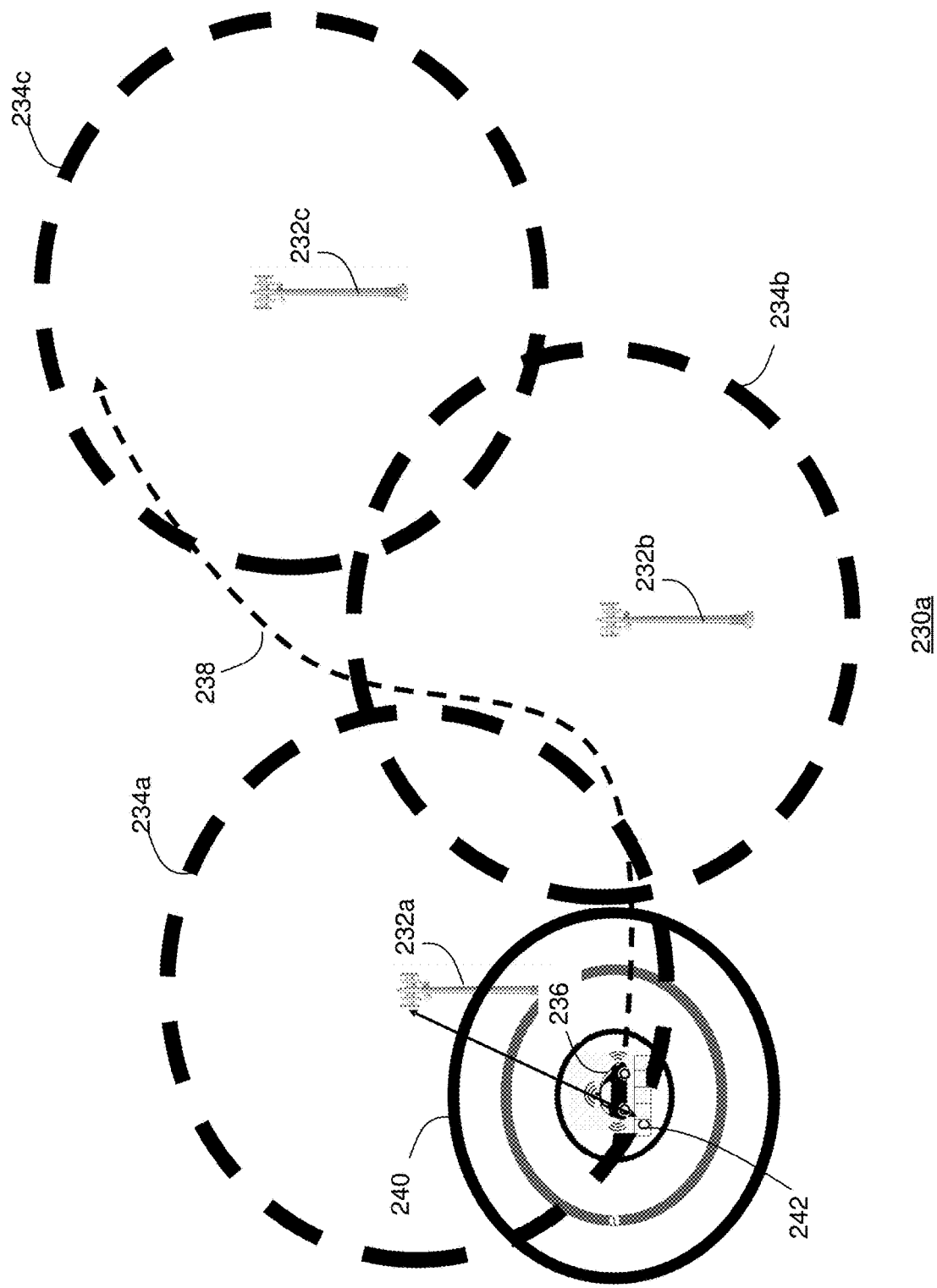
FIGS. 2B through 2F depicts an illustrative embodiment of a system functioning within the communication networks of FIGS. 1 and 2.

FIGS. 2B through 2F depicts an illustrative embodiment of a system functioning within the communication networks of FIGS. 1 and 2 in accordance with various aspects described herein. FIG. 2B illustrates a first system configuration 230a including a mobile cellular service having multiple cell sites 232a, 232b, 232c, generally 232. Each of the cell sites 232 provides a wireless cellular service within a predetermined geographic region and according to a corresponding licensed portion of a frequency spectrum. The illustrative example includes circular regions 234a, 234b, 234c, generally 234 representing regions of cellular service coverage. It is understood that actual coverage may be determined according to sectors, e.g., portions of a circle. It is further understood that the extent of service coverage and/or available bandwidth may vary based on a particular mobile cellular deployment.

A first vehicle 236 includes at least one wireless device capable of communicating within an associated first wireless range 240. The wireless device can include a wireless transceiver of the car itself. Alternatively or in addition, the wireless device can include a wireless transceiver of an occupant or cargo, e.g., machine, of the vehicle 236. When the first vehicle 236 is within one of the regions of cellular coverage 234, it can communicate with equipment of the respective cell site 232 using licensed frequency spectrum. This communication allows the first vehicle to access cloud services, such as a P2P file distribution server, e.g., the file distribution facilitator 181 (FIG. 1), 206 (FIG. 2A).

The first vehicle 236 moves according to a path 238 that may take the vehicle within and without one or more of the regions of cellular coverage 234. At some regions along the path 238, the first vehicle 236 may be in more than one regions of cellular coverage, e.g., being capable of communicating with both a first cell site 232*a* and a second cell site 232*b*. At other regions along the path 238, the vehicle falls outside of any of the regions of cellular coverage 234. It is understood that the illustrated regions of cellular coverage 234 may include in-network coverage, e.g., of a subscribed cellular service plan, and/or out-of-network coverage, e.g., of a competitor's cellular service plan.

According to the illustrative example, the first vehicle 236 is a targeted device of a group of targeted devices that are identified to receive a data content item. The data content item can be disaggregated into a set of data item segments as disclosed herein, and individual segments and/or groups of segments can be transported to the vehicle 236 according to the disclosed P2P process. For illustrative purposes, a segmentation record includes a set of boxes 242 representing a set of segments necessary for the first vehicle 236 to obtain the data content item plus one segment file indicating the amount of all segments and their certificates marked as 'c' in the first position of the boxes. Each segment represents one of the free boxes. The set of boxes 242 is not shaded indicating that all segments are required. However, as segments are received, the boxes of the set of boxes 242 are filled in. An arrow drawn from the first box of the set of boxes 242 to the cell tower 232*a* indicates that the first data item segment is received by the vehicle 236 when the vehicle 236 is within the first region of cellular coverage 234*a*. For the time being, the remaining boxes of the set of boxes 242 remain empty signifying that the vehicle 236 requires segments associated with the remaining unshaded boxes of the set of boxes 244.

Figure 2C:
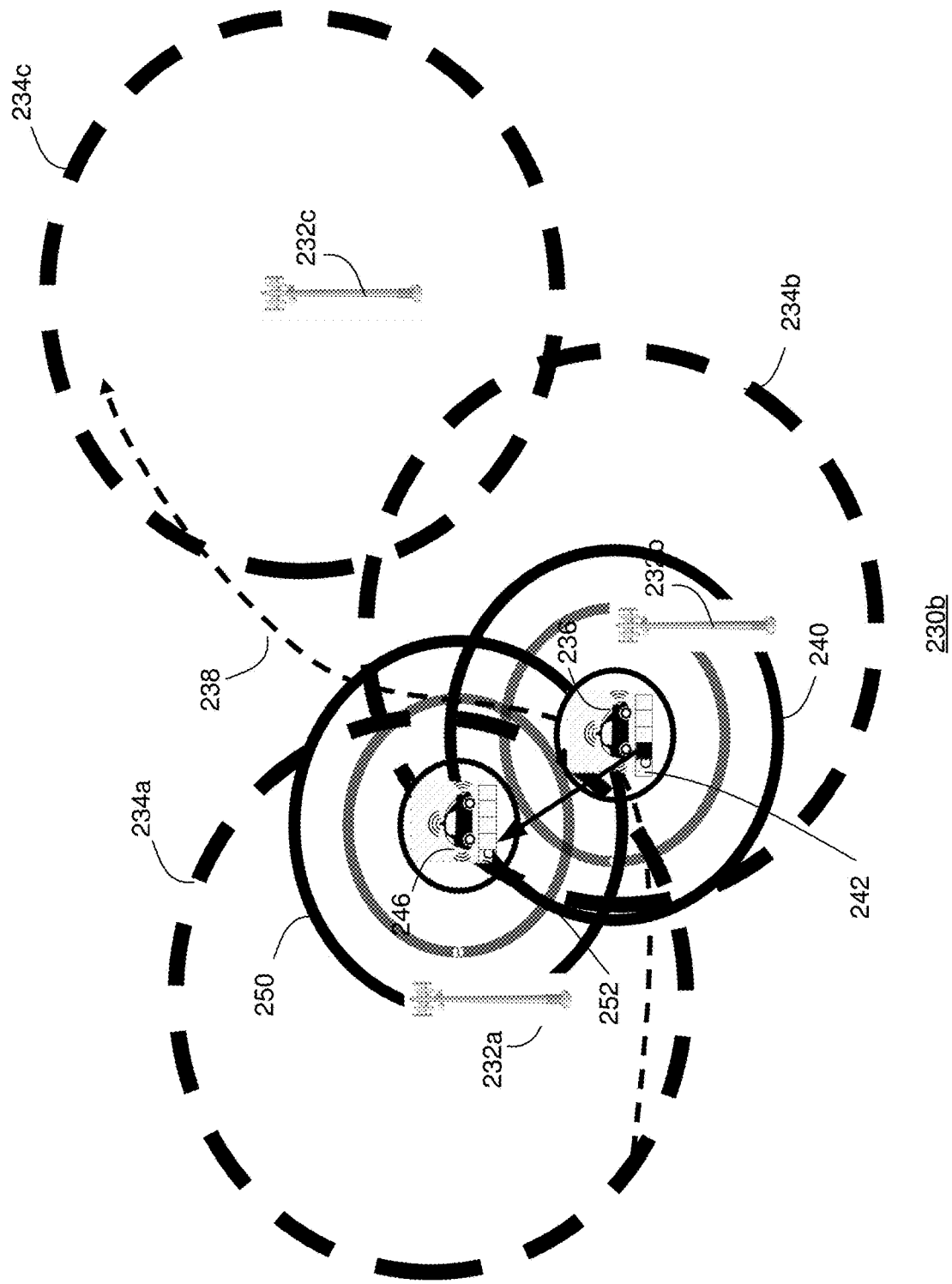

FIG. 2C illustrates a second system configuration 230*b* in which the first vehicle 236 has traveled a first distance to a second location along the path 238. The second location is outside of the first cellular range 234*a* of the first cell site 232*a*, but within the second cellular range 234*b* of the second cell site 232*b*. The first vehicle 236 has already received a first segment of the set of segments according to the preceding system configuration 230*a* (FIG. 2B) represented by a shading of the first box of the set of boxes 242.

The second system configuration 230*b* includes a second vehicle 246 located within the first cellular range 234*a* of the first cell site 232*a* and the second cellular range 234*b* of the second cell site 232*b*. The second vehicle has also received a segmentation record including a set of boxes 252 representing the set of segments necessary for the second vehicle 246 to obtain the data content item. The first and second sets of boxes 242, 252 can include the same boxes associated with the same segments and the same ordering necessary to regenerate the original data content item. However, the tracking of progress of received segments will vary according to the progress of the P2P process.

Being located within range of the first and second cell sites 232*a*, 232*b*, it would be possible for the second vehicle 246 to receive one or more segments from either or both of the cell sites 232*a*, 232*b*. However, a distribution of segments in this manner would utilize scarce licensed frequency spectrum of a Uu LTE link. Advantageously, proximity of the second vehicle 246 to the first vehicle 236 results in an overlapping coverage of the first wireless range 240 of the first vehicle 236 and a second wireless range 250 of the second vehicle 246. According to the illustrative example, both vehicles 236, 246 are participants in a P2P file sharing process. Accordingly, the first vehicle can share one or more segments that it has received. According to the illustrative example, the only segment that the first vehicle 236 can share is a first segment.

An arrow shown between the vehicles 236, 246 indicates a transfer of the first segment from the first vehicle 236 to the second vehicle 246. Beneficially, this vehicle-to-vehicle, i.e., P2P, transfer can occur in unlicensed spectrum based on the overlapping ranges 240, 250. Thus, a portion of the data content item corresponding to the first segment can be provided to the second vehicle without using the licensed frequency spectrum. Upon successful receipt of the first segment, the second set of boxes 252 can be updated to shade in the first box corresponding to receipt of the first segment. There is no change to the first set of boxes 242 being a donor in this instance. It is understood that in at least some instances a progress report, e.g., identifying received segments or shaded boxes, for each of the vehicles can be shared with other P2P participants and/or with the file distribution facilitator 181 (FIG. 1), 206 (FIG. 2A).

Figure 2D:
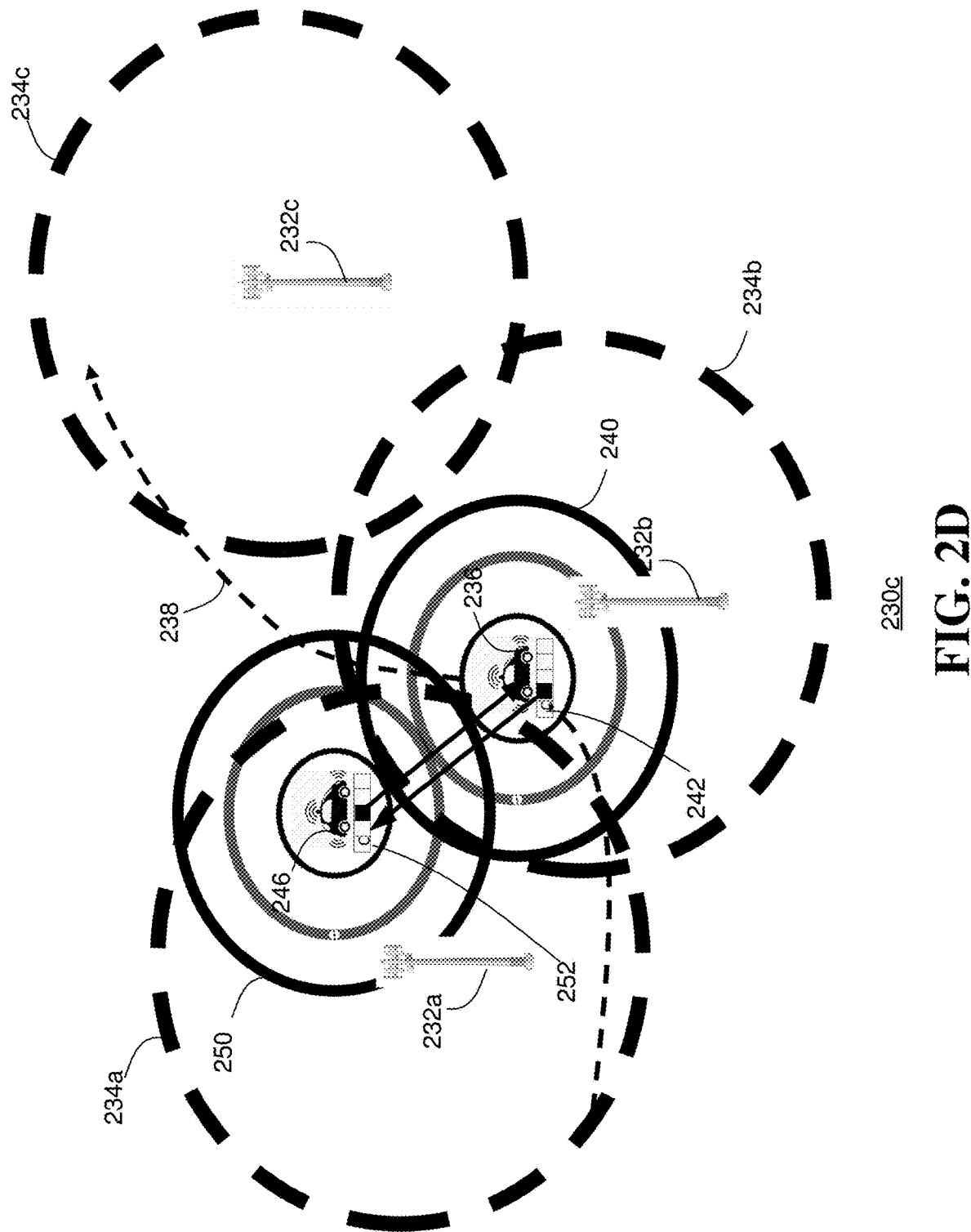

FIG. 2D illustrates a third, alternative system configuration 230*c* in which the first and second vehicles 242, 252 are in the same respective locations, but in this example, the second vehicle 246 has already received a second segment represented by a shading in of a second box of the second set of boxes 252. This scenario allows for a double exchange between the first and second vehicles 236, 246 as P2P participants. Namely, the first vehicle 236 provides a copy of the first segment to the second vehicle, while the second vehicle provides a copy of the second segment to the first vehicle. The separate exchanges can occur simultaneously, e.g., in a full-duplex manner, or sequentially where full-duplex communications and/or bandwidth may not be available. After the exchange, the first set of blocks 242 of the first vehicle 236 will have the first and second blocks shaded representing reception of the first and second segments by the first vehicle 236. Likewise, the second set of blocks 252 of the second vehicle 246 will also have the first and second blocks shaded representing reception of the first and second segments by the second vehicle 246.

Figure 2E:
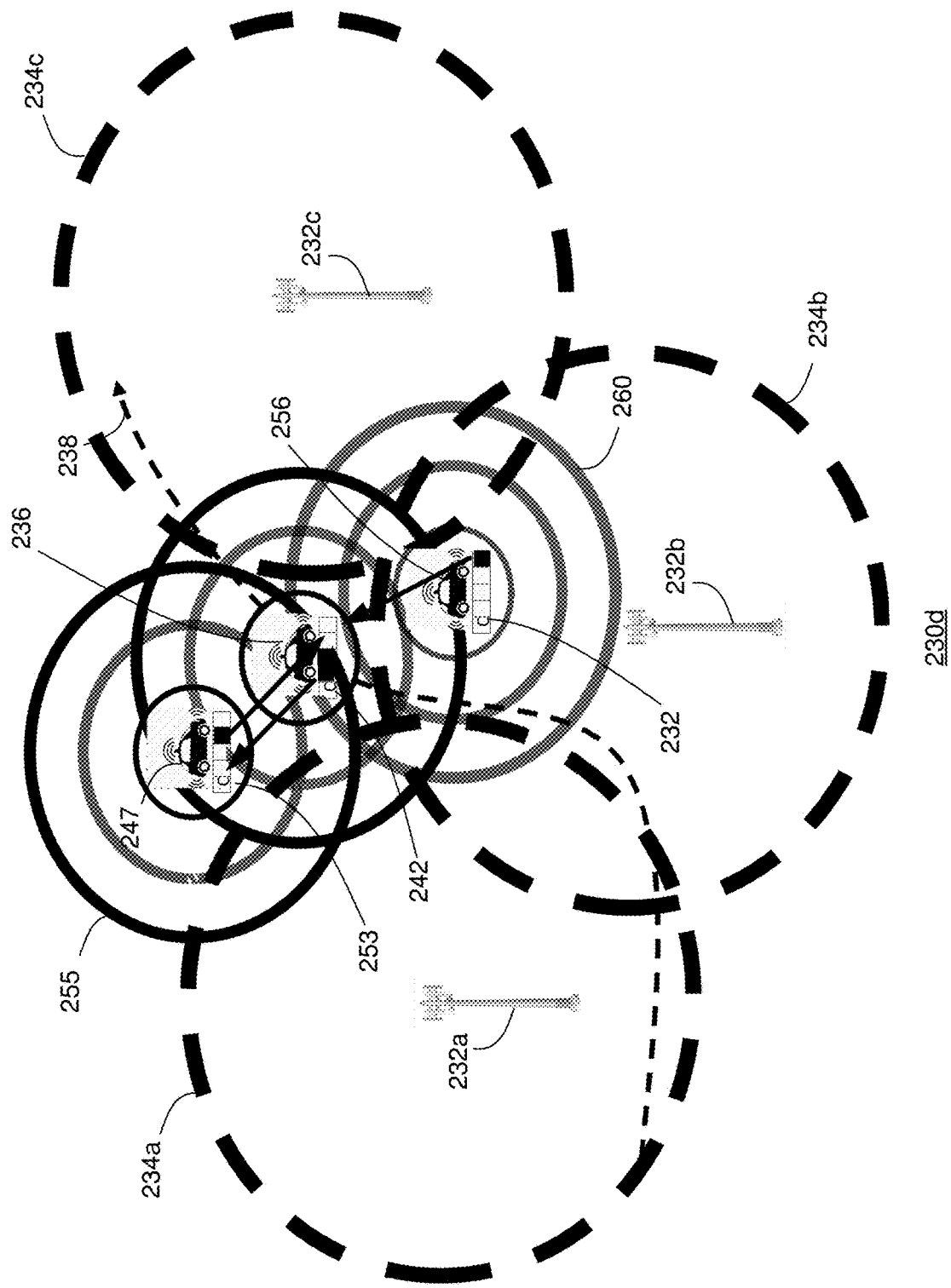

FIG. 2E illustrates a fourth system configuration 230*d* in which the first vehicle 236 has traveled a second distance to a third location along the path 238. The third location is outside of the first cellular range 234*a* of the first cell site 232*a* and outside of the second cellular range 234*b* of the second cell site 232*b*. According to the illustrative example, the first vehicle 236 has already received first and second segments of the set of segments according to the preceding system configurations 230*a* (FIG. 2B) and 230*c* (FIG. 2C) represented by a shading of the first two boxes of the set of boxes 242.

The fourth system configuration 230*d* includes a third vehicle 247 also located outside of the first and second cellular ranges 234*a*, 234*b*. The third vehicle 247 has also received a segmentation record represented by a third set of boxes 253 corresponding to the set of segments necessary for the third vehicle 247 to obtain the data content item. The first and third sets of boxes 242, 253 can include the same boxes associated with the same segments and the same order to support regeneration of the original data content item. However, the tracking of progress of received segments of the first and third sets of boxes 242, 253 will vary based on their respective progress according to the P2P process.

Advantageously, proximity of the third vehicle 247 to the first vehicle 236 results in an overlapping coverage of the first wireless range 240 of the first vehicle 236 and a third wireless range 255 of the third vehicle 247. According to the illustrative example, both vehicles 236, 247 are participants in the P2P file sharing process. Accordingly, the first vehicle 236 can share up to the first two segments that it has received, while the third vehicle 247 can share a third segment that it has received.

A pair of arrows shown between the two vehicles 236, 247 indicates a transfer of the first and second segments from the first vehicle 236 to the third vehicle 247 and a transfer of the third segment from the third vehicle 247 to the first vehicle 236. After the mutual P2P transfer, both vehicles 236, 247 will have received the first three segments of the set of segments. Once again, the vehicle-to-vehicle, i.e., P2P, transfer can occur in unlicensed spectrum based on the overlapping ranges 240, 255 of the respective vehicles. Thus, a portion of the data content item corresponding to the first and second segments can be provided to the third vehicle 247 without using licensed frequency spectrum. Upon successful receipt of the first and second segments, the third set of boxes 253 can be updated to shade in the first three boxes corresponding to receipt of the first three segments. Likewise, the first set of boxes 242 can be updated to shade in the first three boxes corresponding to receipt of the first three segments.

Updated progress reports 242, 253, e.g., identifying received segments or shaded boxes, for each of the vehicles 236, 247 can be shared with other P2P participants and/or with the file distribution facilitator 181 (FIG. 1), 206 (FIG. 2A). In some embodiments, the progress reports 242, 253 of the P2P participants are shared according to a predetermined schedule, e.g., according to a predetermined number of seconds, minutes, hours, days. Alternatively or in addition, the progress reports can be shared according to events. Events can include, without limitation, a change in a number of received segments. The received segments can be obtained by one or more of a P2P exchange, an exchange with cached segments of a network edge device 210 (FIG. 2A) and/or an injection and/or seeding via one or more of the cell sites 232.

The fourth system configuration 230d also illustrates a fourth vehicle 256. By this point in the illustrative example, the first vehicle 236 has already received first, second and third segments of the set of segments. A single segment remains to be received by the first vehicle 236 in order to complete the set of segments 242 allowing for a regeneration of the original data item at the first vehicle 236.

Advantageously, proximity of the fourth vehicle 256 to the first vehicle 236 also results in an overlapping coverage of the first wireless range 240 of the first vehicle 236 and a second wireless range 260 of the fourth vehicle 247. According to the illustrative example, both vehicles 236, 247 are also participants in the P2P file sharing process. Accordingly, the fourth vehicle 247 can share its fourth segment with the first vehicle.

An arrow shown between the vehicles 236, 247 indicates a transfer of the third segment from the fourth vehicle 247 to the second vehicle 246. It is understood that in at least some scenarios, a security measure is applied to one or more of the data content item segments. As disclosed above, the security item can be applied during a pre-processing of the data content item, e.g., coincident with disaggregation and/or after disaggregation but prior to initial injections or seeding by the mobile service provider. In such instances, security information can be generated to facilitate subsequent secure transfer and/or receipt of the data content item segments. The security information can include one or more of a checksum, a hash value, a key and/or other certificate.

In at least some embodiments, the security information is distributed to P2P participants. For example, the security information can be includes within a segmentation report, or provided separately. In at least some embodiments, the security information is distributed separately from the P2P process. Separate distribution can include, without limitation, distribution via licensed frequency spectra, e.g., via SMS, email, file transfer, and the like. In some embodiments, a P2P client application receives the security information from a P2P server application.

An arrow drawn from the fourth vehicle 256 to the first vehicle 236 indicates that the fourth data segment is transferred to the first vehicle to complete the set of segments. The first vehicle 236 upon receipt of the fourth segment, applies the security information to the received segment. However, according to the illustrative example, the fourth segment of a fourth group of blocks 232 of the fourth vehicle 256 has been compromised. Accordingly, application of the security information does not satisfy a security requirement of the security measure. For example, application of a hash algorithm produces a result that differs from a hash value. Accordingly, the first vehicle is unable to use the received segment to complete the set of segments.

In some embodiments, a recipient of a segment that does not satisfy a security requirement notifies a provider of the segment. The notification can request that the segment be resent. It is conceivable that the segment was corrupted during a wireless transfer from the fourth vehicle 256, e.g., due to noise, interference and/or a weak signal level. To the extent the segment is resent, the security information is applied once again. If the security measure fails, the process of resending and re-verifying can be repeated or terminated.

In some embodiments, a security report is generated to indicate that an attempted transfer or number of transfers of a data content item segment failed due to an inability to satisfy the security requirement. For example, a security report can be generated by the recipient, i.e., the first vehicle 236, by the provider, i.e., the fourth vehicle 256, or by both P2P participants 236, 256. The security report(s) can be shared with one or more P2P participants, with a with a mobile network operator, with a file distribution facilitator 181 (FIG. 1), 206 (FIG. 2), with a file ingestor 180 (FIG. 1), 204 (FIG. 2), with a producer or provider of the data content item, or with any combination thereof.

It is understood that in at least some applications the security reports can be monitored, e.g., by any of the recipients or a dedicated security server, and analyzed to determine whether there will be any consequences the P2P distribution. For example, a report of the fourth segment failing a security requirement after transfer to the first vehicle 236 may result in the file distribution facilitator 181 taking action with respect to the provider, i.e., the fourth vehicle. Action might include resending the fourth segment to the fourth vehicle by any of the means disclosed herein including direct injection, e.g., by the second cell site 232b as the fourth vehicle 256 is within the range of cellular coverage 234b, or by P2P sharing from other participants, or any combination thereof. In some embodiments, the file distribution facilitator 181 and/or security server makes note of the security issue, but takes no immediate action. To the extent other security reports indicate security issues with one or more of the same segment or the same provider, e.g., the fourth vehicle 356, subsequent action may be taken. In extreme examples, the source of suspect data segments, e.g., the fourth vehicle 256, can be removed as a participant of the P2P file sharing. Removal can be for a current file transfer and/or from future file transfers.

Figure 2F:
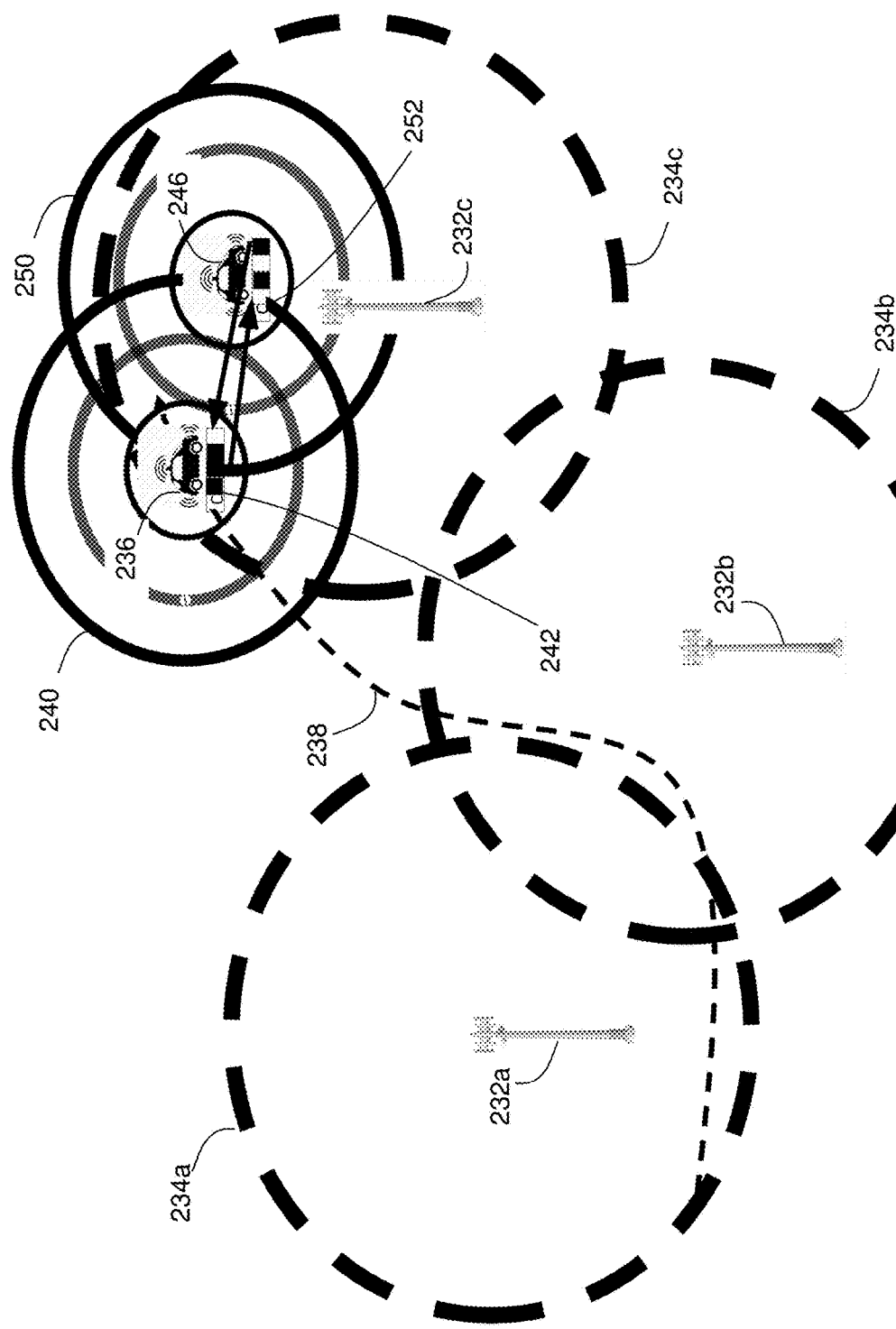

FIG. 2F illustrates a fifth system configuration 230e in which the first vehicle 236 has traveled a third distance to a fourth location along the path 238. The fourth location is outside of the first and second cellular ranges 234a, 264b, but within a third cellular range 234c of a third cell site 232c. According to the illustrative example, the first vehicle 236 only requires a fourth segment of the set of segments to complete the set of segments of the example file transfer. Advantageously, proximity of the second vehicle 246 to the first vehicle 236 also results in an overlapping coverage of the second wireless range 250 of the second vehicle 246 and the first wireless range 240 of the first vehicle 236. Accordingly, the second vehicle 246 can share its fourth segment with the first vehicle 236.

An arrow drawn from the second vehicle 246 to the first vehicle 236 indicates that the fourth data segment is transferred to the first vehicle 236 to complete the set of segments. The first vehicle 236 applies the security information to the received segment and responsive to satisfaction of a security requirement, the P2P file transfer to the first vehicle is nearly completed. The first vehicle, having determined that it has received all of the segments according to the segmentation report, initiates a regeneration process. The regeneration process regenerates the original data content item from the complete set of received segments. Regeneration can include an aggregation of the segments of the complete set of segments. In at least some embodiments, regeneration instructions can be provided to P2P participants, such as the first vehicle 236 to facilitate application of the regeneration process by the first vehicle 236. For example, regeneration instructions can be provided by one or more of the file distribution facilitator 181 (FIG. 1), 206 (FIG. 2), the file ingestor 180 (FIG. 1), 204 (FIG. 2), or both.

It is understood that regeneration of the original file may depend on a particular disaggregation process applied to the original data content item at a time of ingestion. It is conceivable that in some embodiments, more than one different types of disaggregation processes may be applied, e.g., according to a file size, a file type, a priority, network conditions, and the like. Alternatively, a common disaggregation process may be used, such that recipient devices do not require separate regeneration instructions. For example, file regeneration instructions or functionality can be built into a P2P client application allowing the file to be regenerated responsive to receipt of the complete set of segments. It is further conceivable that file regeneration may be performed having received less than a complete set, e.g., for streaming media wherein a sufficient set, being less than a complete set of segments, can be combined to regeneration of a portion of a streaming media file to allow for a presentation of that portion.

Figure 2G:
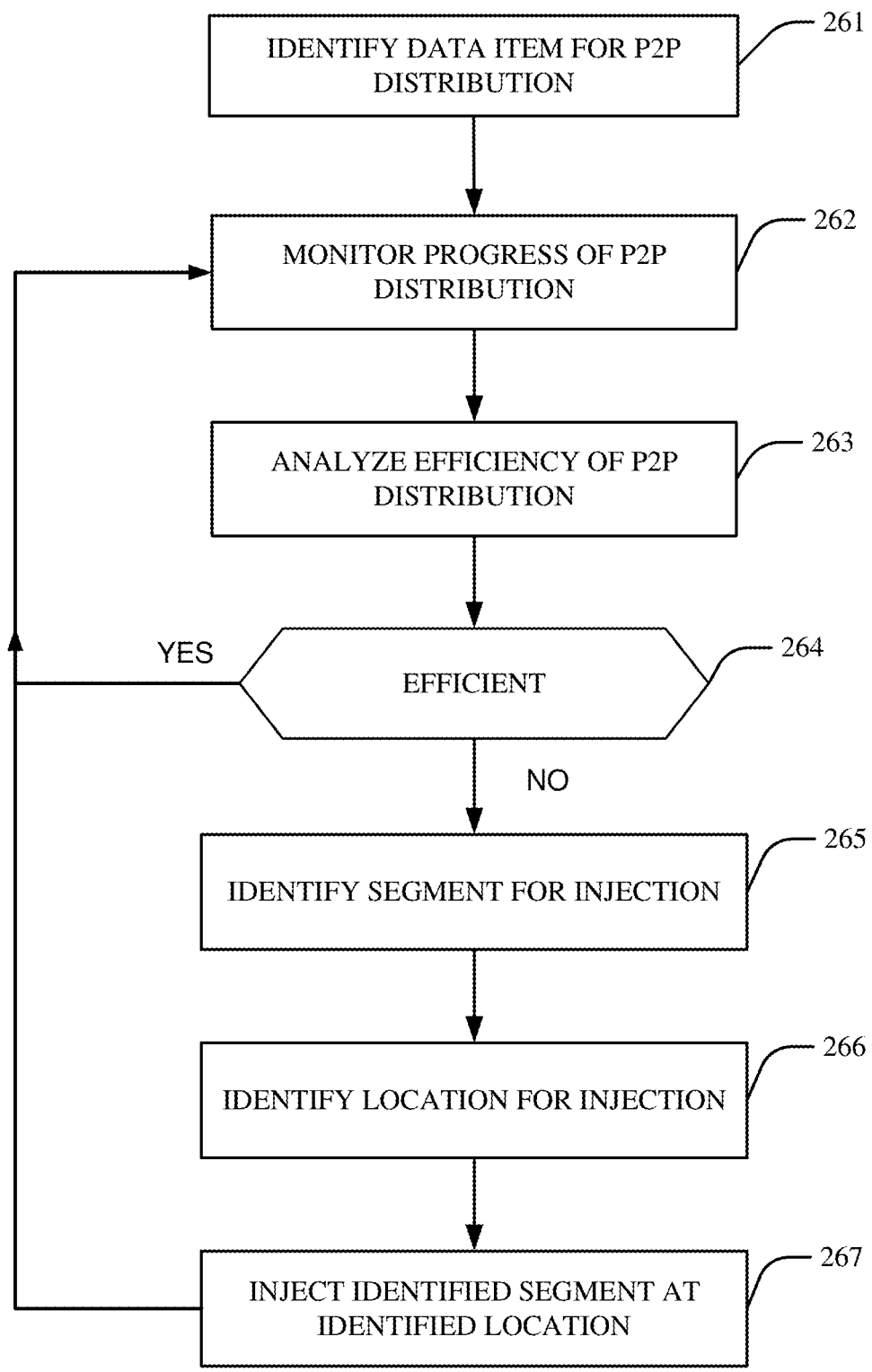
FIG. 2G depicts an illustrative embodiment of a process in accordance with various aspects described herein.

FIG. 2G depicts an illustrative embodiment of a process 260 in accordance with various aspects described herein. The process 260 monitors progress of a wireless delivery of a set of file segments to equipment of a targeted group of users and/or analyzes the progress to identify a deficiency in delivery of one or more file segments of the set of file segments to the wireless equipment of the targeted group of users. Responsive to the deficiency, the process 260 facilitates a wireless provisioning of the particular file segment to the wireless equipment a first group of users via a licensed frequency spectrum.

According to the process 260, a data item is identified for distribution at 261. Identification of the data item can include a request from a producer or provider of the data item. In at least some embodiments, the request is accompanied with or followed by receipt of the data item. The data item is segmented into a set of data item segments that are distributed individual or in groups to the equipment of the targeted group of users via a P2P file sharing process. The P2P process utilizes peer transfers of some data item segments in unlicensed frequency spectra blended with injection of other data item segments un licensed frequency spectra. The blended distribution provides for a timely distribution of the data item that limits use of licensed frequency spectra in an efficient manner.

A progress of P2P file distribution is monitored at 262. For example, progress can be determined according to individual progress reports from P2P participants. Progress reports can provide a measure of completion for each of the P2P participants, e.g., identifying received segments, missing segments, or some other measure, such as a percentage, or simple binary complete/incomplete. Progress can be tracked, e.g., by a file distribution facilitator 181 (FIG. 1).

An efficiency of the P2P file distribution can be determined at 263. An efficiency can be based on any suitable measure, such as progress, segment availability, reachability, connectivity and signal quality, energy level, amount of transmitted/received files (to enforce fairness), elapsed time, remaining time, e.g., when a time limit has been established, ratio of licensed versus unlicensed spectrum, a percentage of licensed and/or unlicensed spectrum, and the like.

To the extent it is determined at 264 that the process 260 is progressing in an efficient manner, the process 260 continues monitoring the progress at 262 and analyzing and/or updating efficiency at 263. In some embodiments, trends and/or changes to progress and/or efficiencies can be determined and used as metrics to further evaluate a P2P file distribution process. For example, a trend in increasing or decreasing efficiency over time can trigger a response from a file distribution facilitator 181. If an efficiency is trending downward, i.e., becoming less efficient, than the file distribution facilitator 181 can revise and/or modify a segment injection policy. Such modifications might include injections of more file segments to offset a downward trend. Modifications can be reversed and/or further modified in a like manner. For example, if increased segment injection results in an increased efficiency, the file injections can be reduced to conserve licensed frequency spectra. It is understood that such a process can be automated, e.g., according to a feedback process to implement a predetermined policy responsive to P2P file transfer performance.

To the extent it is determined at 264 that the process is progressing in an inefficient manner, a segment is identified for injection at 265. Segment injection can include the use of licensed frequency spectra to inject one or more segments in a targeted manner, e.g., to specific users and/or within specific regions. For example, a location of the injection is identified at 266. The location might be a default location, e.g., every cell and/or cell sector, or a subset of cells and/or cell sectors. In at least some embodiments, targeted injection is based on a location of a P2P file distribution that requires one or more particular segments. In some embodiments, P2P progress can be arranged according to a geographical map to identify missing segments versus location. For example, a heat map can be prepared for an overall P2P progress/availability and/or progress of a group of segments. Such a mapping can be based on locations of equipment of the targeted group of users.

The segment is injected at the identified location at 267. The injection can be accomplished to one or more wireless devices within a coverage region of the identified location. For example, one P2P participant, or even a non-participant, can be identified as a destination for the injection. In at least some embodiments, the recipient can further distribute the injected segment according to the P2P process. The process again continues monitoring progress of the P2P distribution at 262.

Figure 2H:
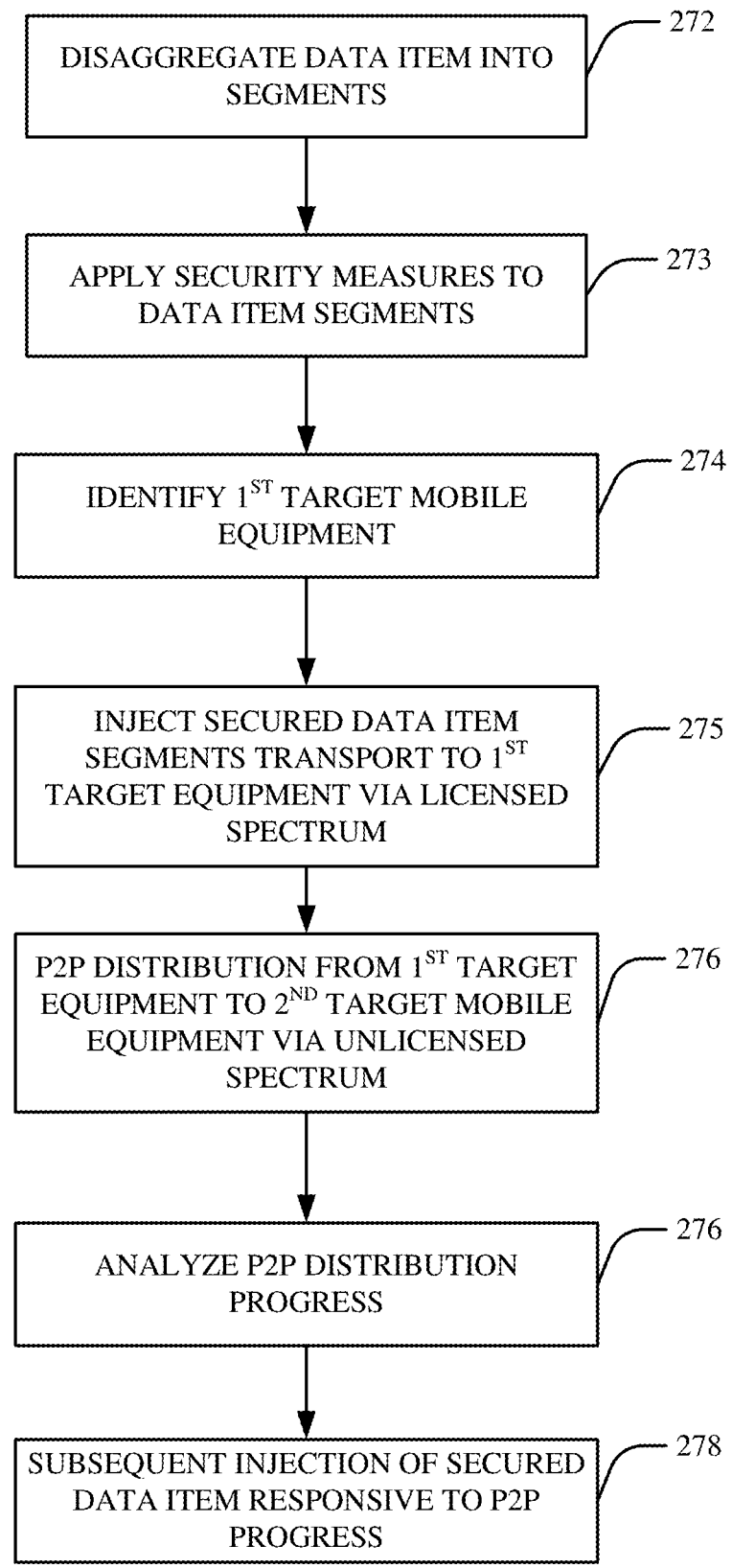
FIG. 2H depicts an illustrative embodiment of another process in accordance with various aspects described herein.

FIG. 2H depicts an illustrative embodiment of a process 280 in accordance with various aspects described herein. A data item is disaggregated into data item segments at 272. Disaggregation can be accomplished by a file ingestor 180 (FIG. 1), 204 (FIG. 2).

A security measure is applied to the data item segments at 273. The security measure can include one or more of the example security measures disclosed herein or otherwise generally know. In at least some examples, the security measure can be applied by the file ingestor 180, 204. It is understood that more than one security measure can be applied. For example, an original data content item may be encrypted or otherwise scrambled before disaggregation. The individual segments resulting from disaggregation can be further secured, e.g., according to a hash, a checksum and/or a blockchain process. The security process includes provisions for receiving devices to apply security information to facilitate recovery of the original data item segments and/or file upon regeneration.

A first targeted wireless device is identified at 274. This can be any wireless device that happens to be within range of one or more cell towers of a mobile communication network. In some embodiments, the targeted wireless device is selected from among multiple devices according to a selection process. The selection process can include consideration as to whether the targeted wireless device is an in-network device, or roaming. Alternatively or in addition, the process can include consideration as to past performance of the particular device, e.g., if the device has been a reliable participant in other P2P file distributions. Still other considerations include types of equipment, signal strength, link quality, mobility, and so on.

In at least some embodiments a P2P push and/or pull process or algorithm monitors parameters that can be used in a selection process. Such parameters can include, without limitation, signal quality and/or channel quality between communicating instances (cell sites, RSUs, end user devices, vehicles, drones, and the like). Selection of a source and/or destination of a segment or group of segments can be based at least in part on the monitored parameters. In some embodiments, monitored parameters can include one or more of mobility, speed, direction, proximity, signal strength, channel quality and the like. For example, a peer group can be established according to proximity, e.g., selecting peers within a geographical region, and/or within a radio signal range. Alternatively or in addition, peers of a group can be selected based on mobility versus stationary. Alternatively or in addition, peer groups can be selected based on a combination of parameters, such as mobility and direction. For example, a peer group can be selected to include vehicles moving in a similar direction. This might include vehicles traveling in the same/similar direction on the same roadway or different roadways in a same general direction. This would favor vehicles that are likely to remain within proximity for some time, versus vehicles moving in opposite or different directions.

A first secured data item segment is transported to the first wireless device at 275 via licensed frequency spectrum, e.g., according to a Uu protocol of a UE to eNB link of a 3GPP LTE (4G) network. The first secured data item segment distributed by the first wireless device to another wireless device via unlicensed frequency spectrum at 276. Transfer via unlicensed spectrum can include any of the examples disclosed herein, including short-range communication, Wifi, Bluetooth, and the like.

Progress of the P2P distribution progress is analyzed at 276 and a subsequent injection of a file segment is initiated at 278 responsive to the distribution progress.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It is understood that in some instances, connectivity may be interrupted while transmitting one or more segments. This can include transmission by one or more of a mobile cellular site 208 232, an RSU 210, and/or equipment including mobile equipment of P2P participants and/or recipient devices 220, 222, 236, 246, 247, 256. Contributors to interruptions can include, without limitation, fading signals, distinct directions and/or loss of line-of-sight. A caching process can be employed by one or more of the P2P participants and/or recipients, such that portions of incomplete segments can be stored locally. Accordingly, an interrupted download of one or more segments can resume when conditions allow, completing transmission of segment(s) without necessarily re-transmitting any cached portions.

Referring now to FIG. 3, a block diagram 300 is shown illustrating an example, non-limiting embodiment of an optionally virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3. For example, the virtualized communication network 300 can facilitate in whole or in part disaggregation of a data content item or file to obtain a set of file segments, wherein the file can be regenerated according to a recombination of the set of file segments. The virtualized communication network 300 can facilitate in whole or in part transport of some file segments of the set of file segments to equipment of a targeted group of users via an unlicensed frequency spectrum and according to a P2P file sharing process. The virtualized communication network 300 can facilitate generation and/or distribution of a segmentation record to the equipment of the targeted group of users, wherein the segmentation record identifies the set of file segments. The virtualized communication network 300 can facilitate in whole or in part monitoring of progress of a delivery of the set of file segments to the equipment of the targeted group of users and/or analysis of the progress to identify a deficiency in delivery of a particular file segment of the set of file segments to the equipment of the targeted group of users. Responsive to the deficiency, the virtualized communication network 300 can facilitate a wireless provisioning of the particular file segment to equipment of the first group of users via a licensed frequency spectrum.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. (FIG. 1). For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage. In at least some embodiments, one or more of the file ingestor 180 (FIG. 1), 204 (FIG. 2) or the file distribution facilitator 181 (FIG. 1), 206 (FIG. 2) can be implemented in one or more VNEs 330, 332, 334 to implement functionality of the P2P process.

In an embodiment, the transport layer 350 includes one or more of fiber, cable, free-space optical, e.g., laser, wired and/or wireless transport elements, e.g., Bluetooth and/or millimeter-wave for licensed and/or unlicensed spectrum, network elements and interfaces to one or more of the foregoing. The transport layer 350 can provide one or more of broadband access 110, wireless access 120, voice access 130, wireless P2P access 380, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) or its components such as mobility management entity (MME) or Packet/Serving-gateways, broadband network gateways, IP edge routers for IP-VPN, Ethernet and other services, load balancers, distributers and other network elements. In at least some embodiments, workloads of at least some elements can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
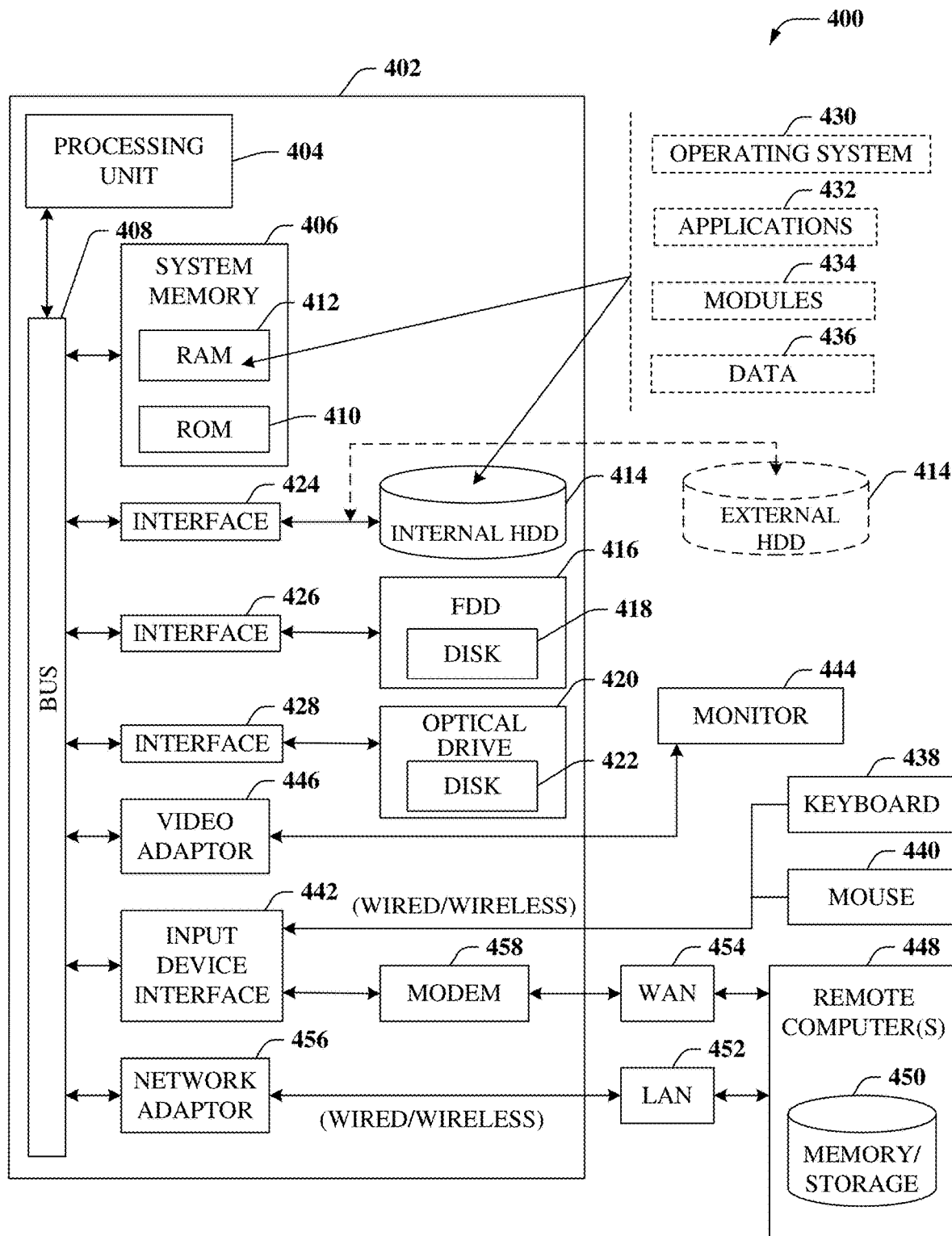
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part file ingestion, file disaggregation, P2P process initiation and/or monitoring and analysis, selected injection of segments based on analysis of monitored progress of the P2P file distribution, and the like.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, user equipment mounted in the car, on-board-units installed in the car, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
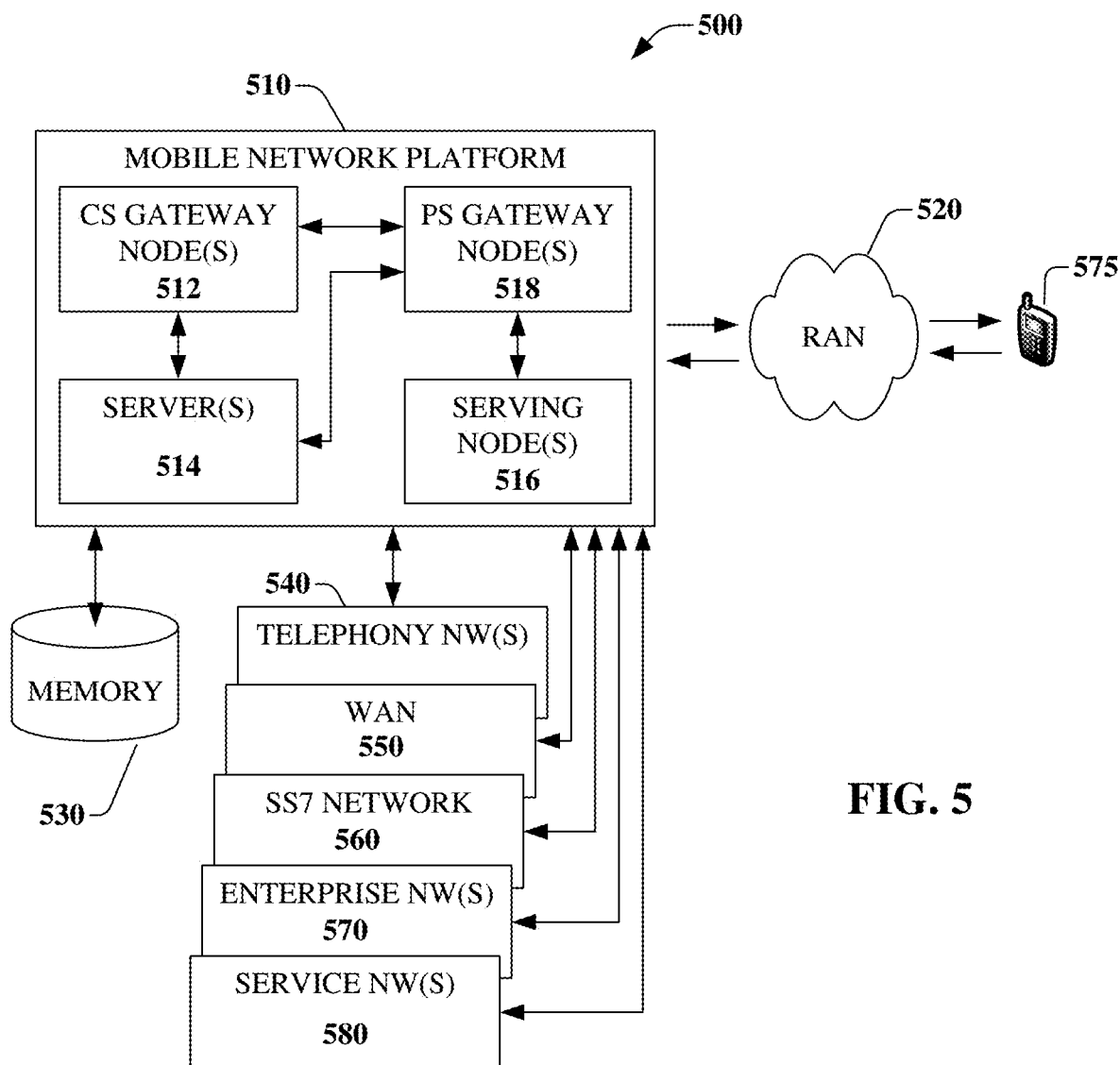
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part file ingestion, file disaggregation, P2P process initiation and/or monitoring and analysis, selected injection of segments based on analysis of monitored progress of the P2P file distribution, and the like. Alternatively or in addition, the platform 510 can implement a P2P client application that receives file segments and regenerates an original file or at least a portion of an original file using received file segments. In some embodiments, the platform 510 applies security information according to a security measure. Alternatively or in addition, the platform 510 monitors progress of a file transfer and provides a status of progress to one or more of other P2P participants and/or a file distribution facilitator 181 (FIG. 1), 206 (FIG. 2). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a $3^{rd}$ Generation Partnership Project (3GPP) UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
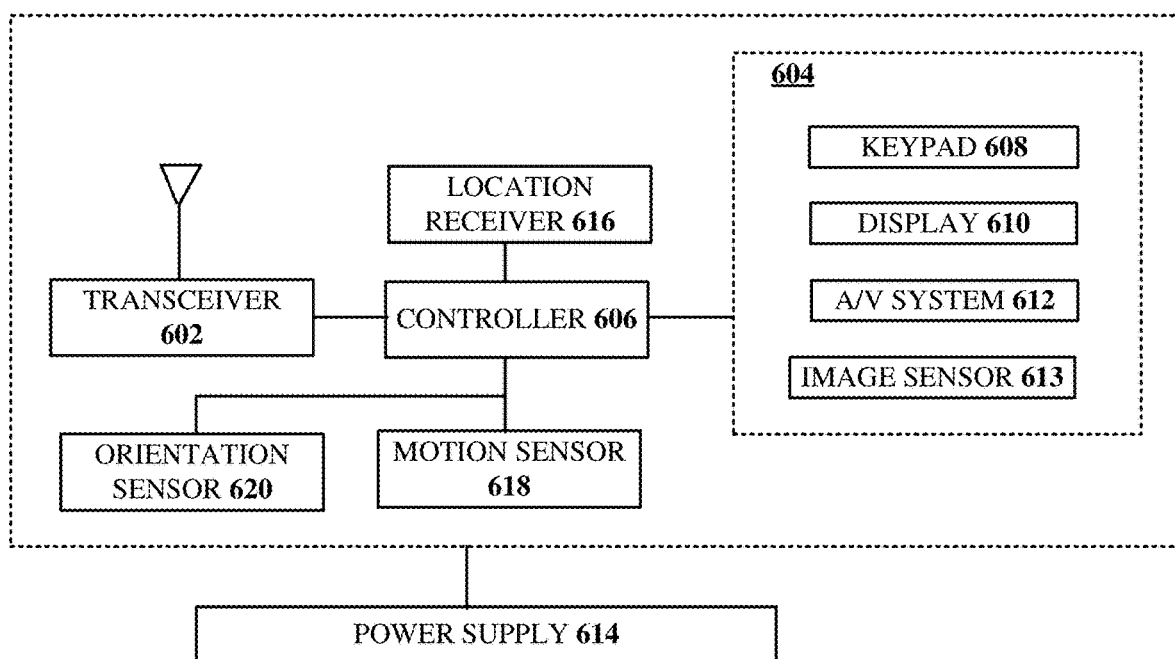
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part file ingestion, file disaggregation, P2P process initiation and/or monitoring and analysis, selected injection of segments based on analysis of monitored progress of the P2P file distribution, file regeneration and the like. Alternatively or in addition, the computing device 600 can implement a P2P client application that receives file segments and regenerates an original file or at least a portion of an original file using received file segments. In some embodiments, the platform 510 generates, distributes and/or applies security information according to a security measure. Alternatively or in addition, the computing device 600 monitors progress of a file transfer and provides a status of progress to one or more of other P2P participants and/or a file distribution facilitator 181 (FIG. 1), 206 (FIG. 2).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In at least some embodiments, a file sharing process, such as the example processes disclosed herein, can include a revoking of content distributed according to the P2P file sharing. A revocation process can be accomplished in a manner similar to the provisioning processes disclosed herein, such that provisioned content can be revoked, terminated and/or otherwise purged from P2P participants. For example, revocation can be initiated according to a planned distribution period and/or lifecycle of data/content. It is understood that a revocation process can be applied to all segments of a data item and/or in a selective manner to a subset of segments of the data item. For example, an updating process can be applied to replace and/or add a scene of a movie, a chapter of a book, and/or a subset or module of provisioned software and/or firmware. Outdated portions may be excised from the P2P process, as necessary, and replaced with updated content, while leaving other portions subject to an earlier P2P process unmodified. Whether an updating process or a replacement process is applied can be determined, e.g., according to estimates of bandwidth usage, time to complete, network conditions, and so on. For example, to the extent it is determined that it would be easier to insert a new item instead of updating existing ones, the process would proceed to revoke the old item in favor of the new one.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
a processing system including a processor; and
a memory that stores executable instructions that, when executed by the processing system, facilitate performance of operations, the operations comprising:
disaggregating a file to obtain a set of file segments, wherein the file can be regenerated according to a recombination of the set of file segments, and wherein at least some file segments of the set of file segments are transported to equipment of a targeted group of users via an unlicensed frequency spectrum and according to a peer-to-peer (P2P) file sharing process;
forwarding a segment list to the equipment of the targeted group of users comprising a first group of users and a second group of users, wherein the segment list identifies the set of file segments;
monitoring a progress of a delivery of the set of file segments to the equipment of the targeted group of users according to the segment list;
analyzing the progress of the delivery of the set of file segments to identify a deficiency in delivery of a particular file segment of the set of file segments to the equipment of the targeted group of users; and
providing, responsive to the deficiency, the particular file segment to first equipment of the equipment of the first group of users wirelessly via a licensed frequency spectrum, wherein the first equipment and second equipment of the equipment of the second group users are selected to engage in an exchange of the particular file segment from the first equipment to the second equipment, via the unlicensed frequency spectrum, based on anticipated proximity of the first equipment and the second equipment during the exchange.

2. The system of claim 1, wherein the second group of users obtains the particular file segments via the P2P process.

3. The system of claim 1, wherein the operations further comprise facilitating a secure exchange of the file segments to the equipment of the targeted group of users.

4. The system of claim 3, wherein the facilitating of the secure exchange of the file segments further comprises providing security material to the equipment of the targeted group of users, wherein a confirmation of the secure exchange is based on the security material.

5. The system of claim 4, wherein facilitating of the secure exchange of the file segments to the equipment of the targeted group of users comprise applying one of a hash function, a blockchain, encryption, or a combination thereof.

6. The system of claim 5, wherein the security material comprises one of a checksum, a hash value, an encryption key, or a combination thereof.

7. The system of claim 1, wherein the operations further comprise generating the segment list.

8. The system of claim 1, wherein the analyzing of the progress of the delivery of the set of file segments further comprises analyzing manifest records for the equipment of the targeted group of users, wherein the manifest records identify for equipment of each targeted user of the targeted group of users, those file segments delivered to the equipment of each targeted user of the targeted group of users.

9. The system of claim 1, wherein the file comprises streaming media.

10. The system of claim 1, wherein the providing of the segment list comprises transport of the segment list via the licensed frequency spectrum.

11. A method, comprising:
segmenting, by a processing system including a processor, a file to obtain a set of file segments, wherein the file can be regenerated according to a recombination of the set of file segments, and wherein at least some file segments of the set of file segments are transported to equipment of a targeted group of users via an unlicensed frequency spectrum and according to a peer-to-peer (P2P) file sharing process;
providing, by the processing system, a segmentation record to the equipment of the targeted group of users comprising a first group of users and a second group of users, wherein the segmentation record identifies the set of file segments;
identifying, by the processing system, a deficiency in delivery of a particular file segment of the set of file segments to the equipment of the targeted group of users according to the segmentation record; and
providing, by the processing system and responsive to the deficiency, the particular file segment to first equipment of the equipment of the first group of users wirelessly via a licensed frequency spectrum, wherein the first equipment and second equipment of the equipment of the second group users are selected to engage in an exchange of the particular file segment from the first equipment to the second equipment, via the unlicensed frequency spectrum, based on anticipated proximity of the first equipment and the second equipment during the exchange.

12. The method of claim 11, wherein the second group of users obtains the particular file segments via the P2P process.

13. The method of claim 11, further comprising facilitating a secure exchange of the file segments to the equipment of the targeted group of users.

14. The method of claim 13, wherein the facilitating of the secure exchange of the file segments further comprises providing security material to the equipment of the targeted group of users, wherein a confirmation of the secure exchange is based on the security material.

15. The method of claim 14, wherein facilitating of the secure exchange of the file segments to the equipment of the targeted group of users comprise applying one of a hash function, a blockchain, encryption, or a combination thereof.

16. A non-transitory, machine-readable medium, comprising executable instructions that, when executed by a processing system including a processor, facilitate performance of operations, the operations comprising:
segmenting a data item to obtain a set of data item segments, wherein the data item can be regenerated according to a recombination of the set of data item segments, and wherein at least some data item segments of the set of data item segments are transported to equipment of a targeted group of users via an unlicensed frequency spectrum and according to a peer-to-peer (P2P) file sharing process;

providing a segmentation record to the equipment of the targeted group of users comprising a first group of users and a second group of users, wherein the segmentation record identifies the set of data item segments;

identifying a deficiency in delivery of a particular data item segment of the set of data item segments to the equipment of the targeted group of users according to the segmentation record; and providing, responsive to the deficiency, the particular data item segment to first equipment of the equipment of the first group of users wirelessly via a licensed frequency spectrum, wherein the first equipment and second equipment of the equipment of the second group users are selected to engage in an exchange of the particular data item segment from the first equipment to the second equipment, via the unlicensed frequency spectrum, based on anticipated proximity of the first equipment and the second equipment during the exchange.

17. The non-transitory, machine-readable medium of claim 16, wherein the second group of users obtains the particular data item segments via the P2P process.

18. The non-transitory, machine-readable medium of claim 16, wherein the operations further comprise facilitating a secure exchange of the data item segments to the equipment of the targeted group of users.

19. The non-transitory, machine-readable medium of claim 18, wherein the facilitating of the secure exchange of the data item segments further comprises providing security material to the equipment of the targeted group of users, wherein a confirmation of the secure exchange is based on the security material.

20. The non-transitory, machine-readable medium of claim 19, wherein facilitating of the secure exchange of the data item segments to the equipment of the targeted group of users comprise applying one of a hash function, a blockchain, encryption, or a combination thereof.

* * * * *